(12) United States Patent
Nagano

(10) Patent No.: US 9,661,303 B2
(45) Date of Patent: May 23, 2017

(54) MULTI-CAMERA STEREOSCOPIC IMAGING APPARATUS FOR REDUCING THE EFFECTS OF ABERRATION

(71) Applicant: Sony Corporation, Tokyo (JP)

(72) Inventor: Hidetoshi Nagano, Kanagawa (JP)

(73) Assignee: Sony Corporation (JP)

(*) Notice: Subject to any disclaimer, the term of this patent is extended or adjusted under 35 U.S.C. 154(b) by 525 days.

(21) Appl. No.: 13/708,209

(22) Filed: Dec. 7, 2012

(65) Prior Publication Data

US 2013/0155198 A1 Jun. 20, 2013

(30) Foreign Application Priority Data

Dec. 14, 2011 (JP) ................................. 2011-273664

(51) Int. Cl.
*H04N 13/02* (2006.01)
*G02B 27/22* (2006.01)

(52) U.S. Cl.
CPC ......... *H04N 13/0239* (2013.01); *G02B 27/22* (2013.01)

(58) Field of Classification Search
CPC ............................ H04N 13/0239; G02B 27/22
See application file for complete search history.

(56) References Cited

U.S. PATENT DOCUMENTS

| | | | | |
|---|---|---|---|---|
| 5,396,302 A | * | 3/1995 | Triller | A61B 3/1225 351/205 |
| 5,689,365 A | * | 11/1997 | Takahashi | A61B 1/00179 348/E13.014 |
| 5,743,846 A | * | 4/1998 | Takahashi | G02B 23/2415 600/111 |
| 2010/0328561 A1 | * | 12/2010 | Schuck et al. | 349/9 |

FOREIGN PATENT DOCUMENTS

| | | | |
|---|---|---|---|
| JP | H07294827 A | | 11/1995 |
| JP | H10004567 | | 1/1998 |
| JP | 2000134641 A | | 5/2000 |
| JP | 2000193883 A | | 7/2000 |
| JP | 2001012915 A | | 1/2001 |
| JP | 2001194585 A | | 7/2001 |
| JP | 2002033276 A | | 1/2002 |
| JP | 2002232920 A | | 8/2002 |
| JP | 2003-005313 | * | 1/2003 |
| JP | 2003-005313 A | | 1/2003 |

(Continued)

OTHER PUBLICATIONS

Japanese Office Action for JP Application No. 2011273664, dated Mar. 15, 2016.

(Continued)

*Primary Examiner* — Thai Tran
*Assistant Examiner* — Christopher T Braniff
(74) *Attorney, Agent, or Firm* — Lerner, David, Littenberg, Krumholz & Mentlik, LLP

(57) ABSTRACT

According to an illustrative embodiment, an imaging system is provided. The system includes a first imaging unit; a second imaging unit; and an objective optical system optically coupled to the first imaging unit and the second imaging unit, wherein the objective optical system has a first direction along which light is refracted and a second direction along which light is refracted differently.

8 Claims, 15 Drawing Sheets

(56) References Cited

FOREIGN PATENT DOCUMENTS

| | | | |
|---|---|---|---|
| JP | 2003307800 | A | 10/2003 |
| JP | 2011203245 | A | 10/2011 |
| JP | 2011239207 | A | 11/2011 |
| WO | 2011121840 | A1 | 10/2011 |

OTHER PUBLICATIONS

Chinese Office Action for Application No. 201210525416.6 dated Jun. 29, 2016.
Japanese Office Action for JP Application No. 2011273664, dated Aug. 25, 2015.

* cited by examiner

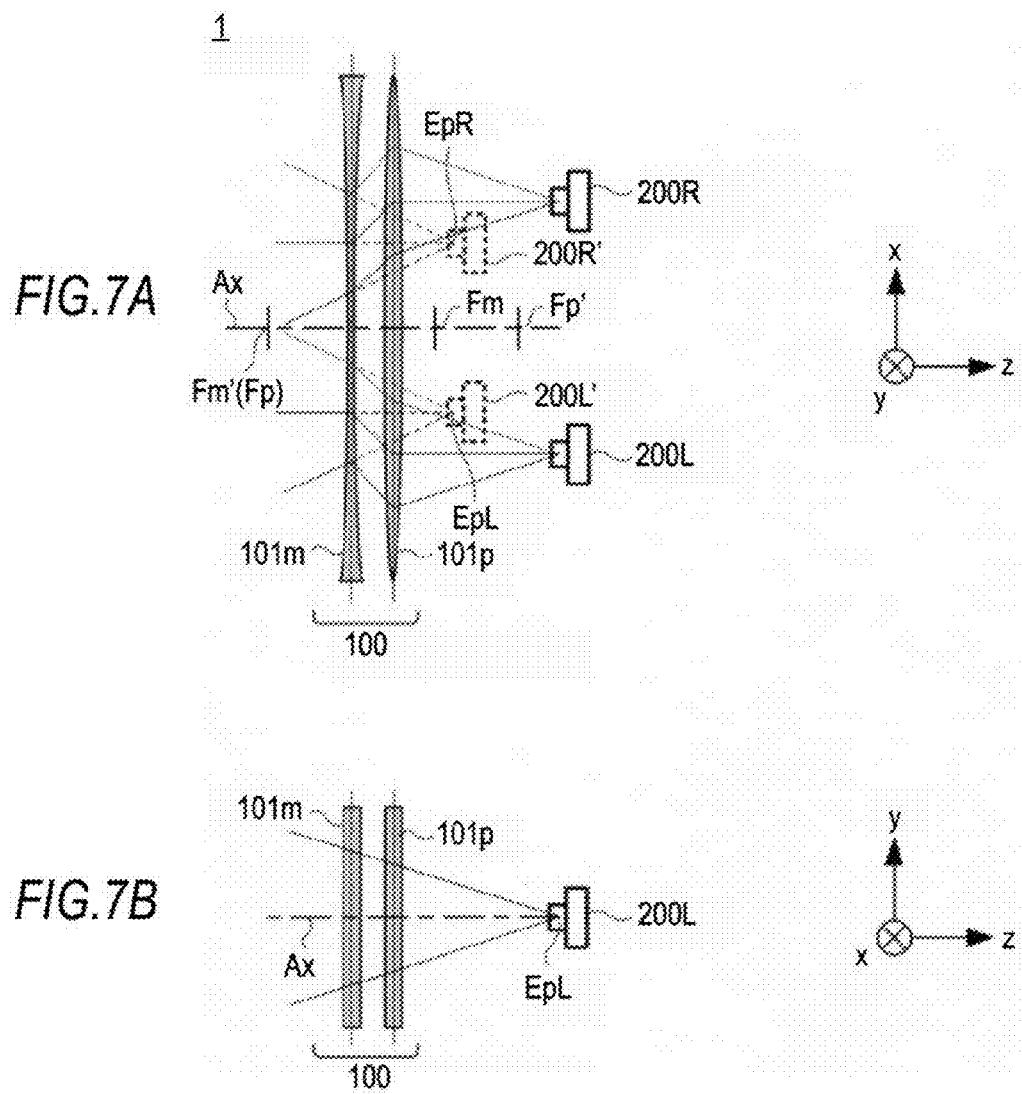
*FIG.7A*
*FIG.7B*
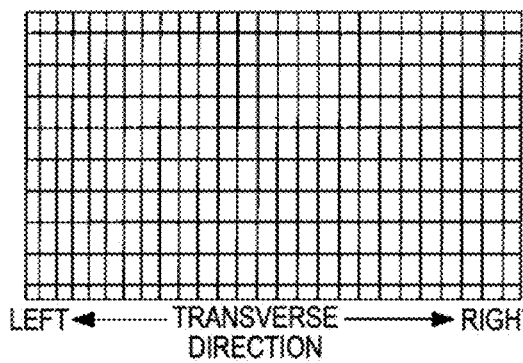
*FIG.8A*
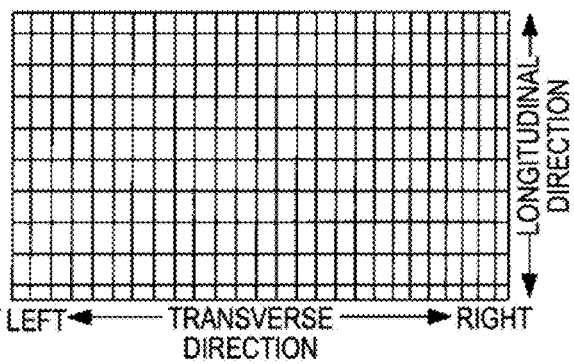
*FIG.8B*

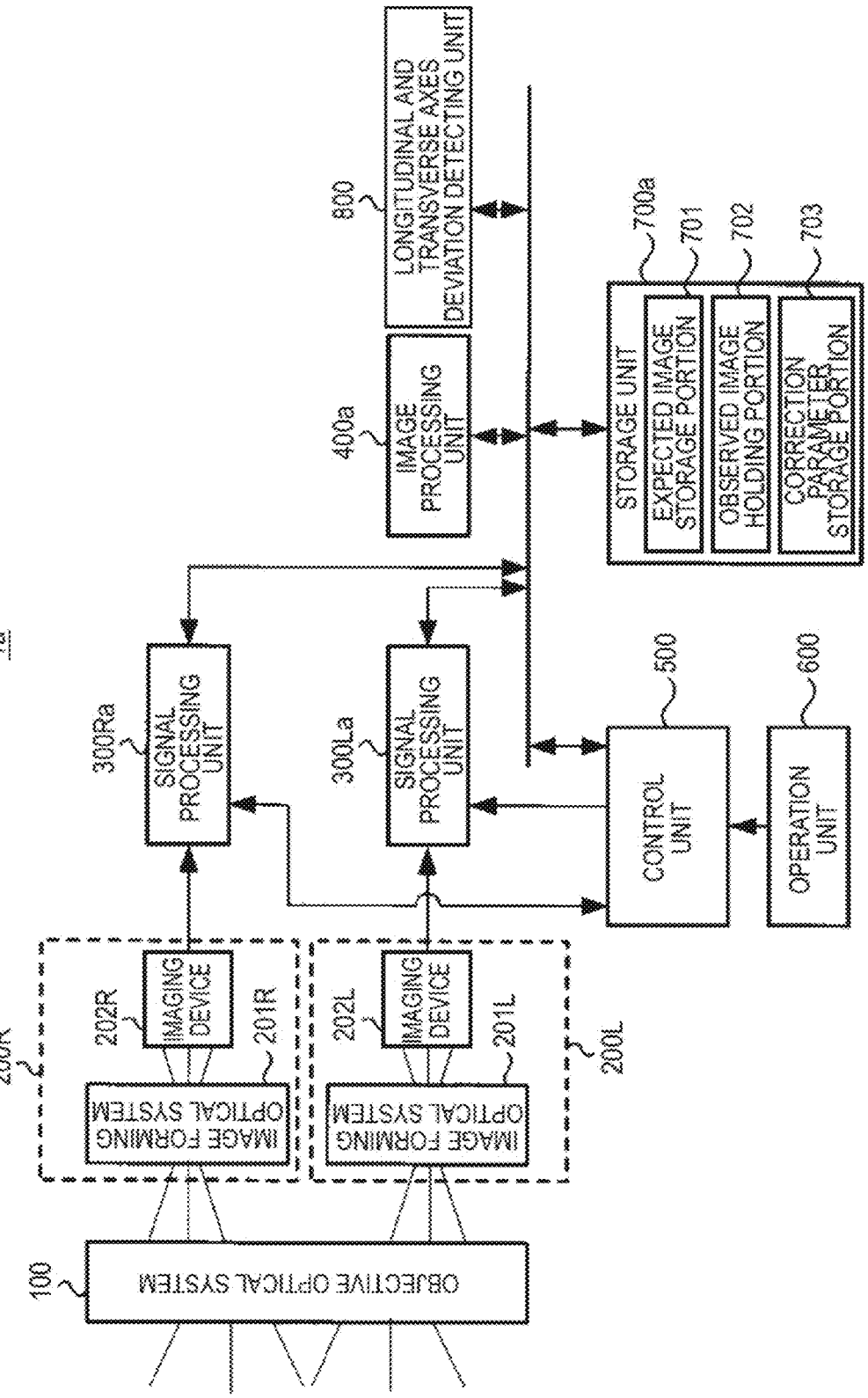

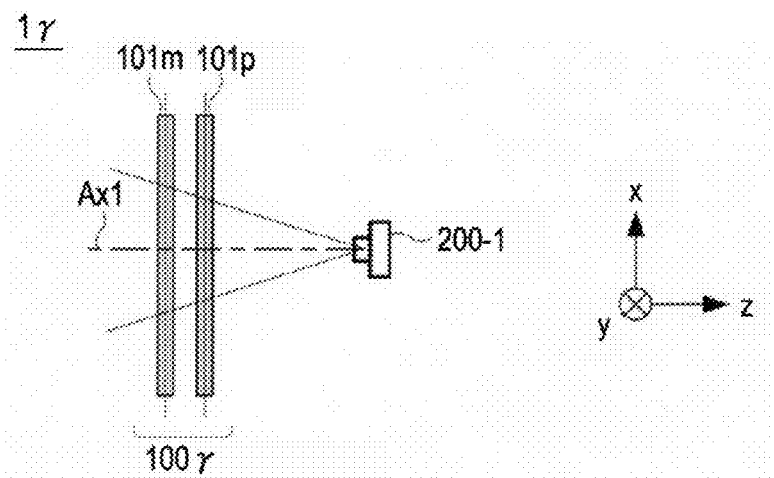
FIG. 19A
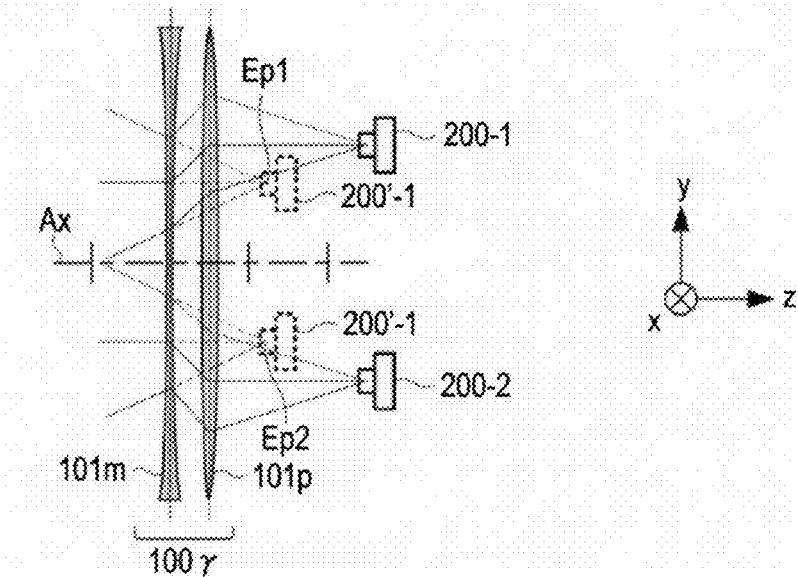
FIG. 19B
FIG. 20A
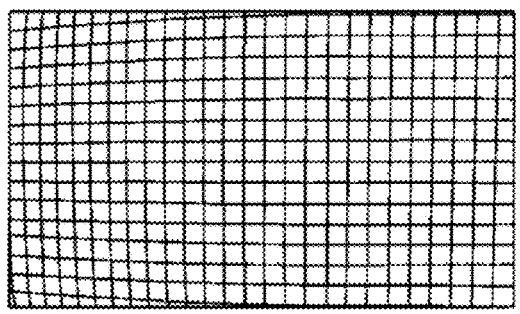
FIG. 20B
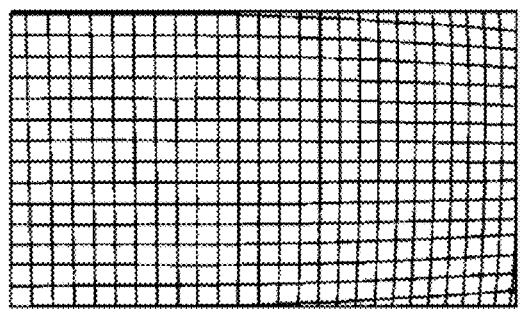

MULTI-CAMERA STEREOSCOPIC IMAGING APPARATUS FOR REDUCING THE EFFECTS OF ABERRATION

CROSS-REFERENCE TO RELATED APPLICATION

The present application claims priority from Japanese Patent Application No. JP 2011-273664 filed in the Japanese Patent Office on Dec. 14, 2011, the entire content of which is hereby incorporated by reference herein.

FIELD

The present disclosure relates to a stereoscopic imaging apparatus which captures stereoscopic images, and more particularly to a technique for reducing adverse effects of aberration appearing in an image signal which exert on the forming of stereoscopic images.

BACKGROUND

In recent years, there has been increasing demand for cameras (stereoscopic imaging apparatuses) capable of capturing 3D (stereoscopic) images. As methods of capturing stereoscopic images, there have been used a beam splitter type (half mirror type) of capturing images using a half mirror, a side-by-side type (parallel two-lens type) of capturing images using two imaging apparatuses which are physically arranged and installed, and the like. In these capturing types, the imaging apparatuses are mounted on a cradle called a rig and image capture is performed, and thus the degree of freedom of installation of the imaging apparatuses is increased. For example, a distance between two lenses (base-line length, hereinafter, referred to as an IAD (Inter Axial Distance)) capturing stereoscopic images, convergence, or a field angle can be selected with a high degree of freedom.

However, there is a problem in that whereas a degree of freedom is high, great effort and time are necessary for settings and adjustments for each capturing in order to mount the stereoscopic imaging apparatuses on the rig. In addition, there is also a problem in that particularly a rig of an imaging apparatus employing the beam splitter type is a large-scale device, and is not suitable for capturing or coverage in the field. Further, in an imaging apparatus employing the side-by-side type, since the respective optical systems or imagers of the two lenses physically interfere with each other, the IAD may not be shorter than a specific distance defined by disposition positions of the optical systems or imagers. For this reason, for example, in a case of very near capturing of a subject, parallax at a location distant only several meters behind the subject is displayed on a 3D display exceeds a parallax range where people view 3D images with comfort.

For example, JP-A-2003-5313 discloses that a single objective optical system is disposed on the front side (subject side) of a plurality of image forming optical systems, and thereby a convergence point can be moved.

SUMMARY

However, according to the configuration disclosed in JP-A-2003-5313, it is considered that the objective optical system is provided, and thereby not only an actual pupil of the image forming optical system but also a virtual pupil corresponding thereto are formed. The virtual pupil described here is a point through which, of light beams emitted from the subject, all the light beams passing through the objective optical system and passing through a lens center of the image forming optical system pass. In other words, it can be said that an image formed in an imaging device of the image forming optical system is an image equivalent to an image which is captured using the virtual pupil as a pupil (hereinafter, the virtual pupil is referred to as an "effective pupil").

Therefore, a distance between two effective pupils becomes a substantial IAD (hereinafter, the substantial IAD is referred to as an "effective IAD") of the stereoscopic imaging apparatus. In addition, the present inventors have found that the effective IAD is made to be shorter than a physical IAD set by a disposition position of the image forming optical system, by contriving a configuration or a disposition of lenses used as the objective optical system.

On the other hand, when a single objective optical system is provided on the front side of a plurality of image forming optical systems, an optical axis of the objective optical system and an optical axis of the image forming optical systems do not match with each other. For this reason, in an image region by light fluxes passing through a position separated from the optical axis of the objective optical system, effects of distortion aberration or chromatic aberration of magnification increase due to separation from the central axis. Thereby, a captured image is divided into portions on which the aberration exerts great effects and small effects with respect to a center of the image.

In particular, in a case of stereoscopic vision by two-lens imaging, since two image forming optical systems are disposed at positions deviated in the left and right directions with respect to the optical central axis of the objective optical system, a generation state of distortion aberration or chromatic aberration of magnification is different in left and right images with parallax which is obtained as a result of capturing. FIGS. 20A and 20B show an example of the images which are results obtained by capturing a lattice pattern in which intervals where longitudinal lines and transverse lines intersect each other are equal with a relatively wide field angle using a stereoscopic imaging apparatus having a single objective optical system and two image forming optical systems. It can be seen that, in FIG. 20A showing a left eye parallax image, large distortion aberration occurs at the left end side of the image, and in FIG. 20B showing a right eye parallax image, large distortion aberration occurs at the right end side of the image. It is characteristic that the distortion shown in the vertical direction is larger than the distortion shown in the horizontal direction in any image.

In order to prevent such aberration, designing an optical system where it is difficult for aberration to occur is a solution. However, there are many cases where a gap between optical axes of a plurality of image forming optical systems on the rear stage of the objective optical system is relatively large, and, in these cases, in the objective optical system for reducing aberration, the number of lenses increases or the size of a lens becomes large. In other words, this causes an increase in the weight and price of the optical system.

In addition, aberration may be corrected through an image signal process by a signal processing circuit of the stereoscopic imaging apparatus. However, as shown in FIGS. 20A and 20B, if distortion of the image in the vertical direction is large, it is necessary to prepare for the number of line memories in the vertical direction as many as all the pixels in the horizontal direction in order to perform the correction.

However, if a total capacity of line memories is increased, manufacturing costs are also increased accordingly.

It is therefore desirable to reduce adverse effects of aberration appearing an image signal which exert on forming of stereoscopic vision without increasing manufacturing costs as much as possible in a stereoscopic imaging apparatus which can adjust a distance between a plurality of pupils which are virtually formed by the stereoscopic imaging apparatus.

An imaging system according to an illustrative embodiment includes a first imaging unit; a second imaging unit; and an objective optical system optically coupled to the first imaging unit and the second imaging unit, wherein the objective optical system has a first direction along which light is refracted and a second direction along which light is refracted differently.

With this configuration, a refractive power which acts on subject light incident in one of the first or second direction is weakened, and thus it is possible to reduce appearance of aberration which is generated in the one direction of images obtained by the imaging devices. In other words, it is possible to suppress an increase in manufacturing costs as much as possible (without designing a dedicated aberration correcting lens or increasing a capacity of a line memory) and to reduce adverse effects of aberration appearing in image signals which exerts on forming of stereoscopic vision.

BRIEF DESCRIPTION OF THE DRAWINGS

FIG. 2A shows an example where the objective optical system is constituted by two positive lenses, FIG. 2B shows an example where the objective optical system is constituted by a negative lens and a positive lens, and FIG. 2C shows an example where the objective optical system is constituted by a positive lens and a negative lens.

FIG. 5A is a perspective view and FIGS. 5B and 5C are side views.

FIG. 6A is a perspective view, and FIGS. 6B and 6C are side views.

FIGS. 7A and 7B are schematic diagrams illustrating a configuration example of the stereoscopic imaging apparatus according to the first embodiment of the present disclosure, where FIG. 7A is a top view, and FIG. 7B is a side view.

FIGS. 8A and 8B are diagrams illustrating examples of left and light parallax images captured by the stereoscopic imaging apparatus according to the first embodiment of the present disclosure, where FIG. 8A shows a left eye parallax image, and FIG. 8B shows a right eye parallax image.

FIG. 9 is a block diagram illustrating a configuration example of the stereoscopic imaging apparatus according to a modified example of the first embodiment of the present disclosure.

FIG. 11A is a top view, and FIG. 11B is a side view.

FIG. 12A shows a left eye parallax image, and FIG. 12B shows a right eye parallax image.

FIG. 14A is a top view, and FIG. 14B is a side view.

FIG. 15A shows a left eye parallax image, and FIG. 15B shows a right eye parallax image.

FIG. 16A is a top view, and FIG. 16B is a side view.

FIG. 18A is a top view, and FIG. 18B is a side view.

FIGS. 19A and 19B are schematic diagrams illustrating a configuration example of a stereoscopic imaging apparatus according to a modified example of the present disclosure, where FIG. 19A is a top view, and FIG. 19B is a side view.

FIGS. 20A and 20B are diagrams illustrating examples of the parallax images captured by a stereoscopic imaging apparatus having an objective optical system in the related art, where FIG. 20A shows a left eye parallax image, and FIG. 20B shows a right eye parallax image.

DETAILED DESCRIPTION

Hereinafter, embodiments of the present disclosure will be described. In addition, the description will be made in the following order.
  1. Principle Where Effective Pupil Is Formed
  2. First Embodiment
  3. Modified Example of First Embodiment
  4. Second Embodiment
  5. Third Embodiment
  6. Fourth Embodiment
  7. Various Modified Examples

1. Principle where Effective Pupil is Formed

Figure 1A:
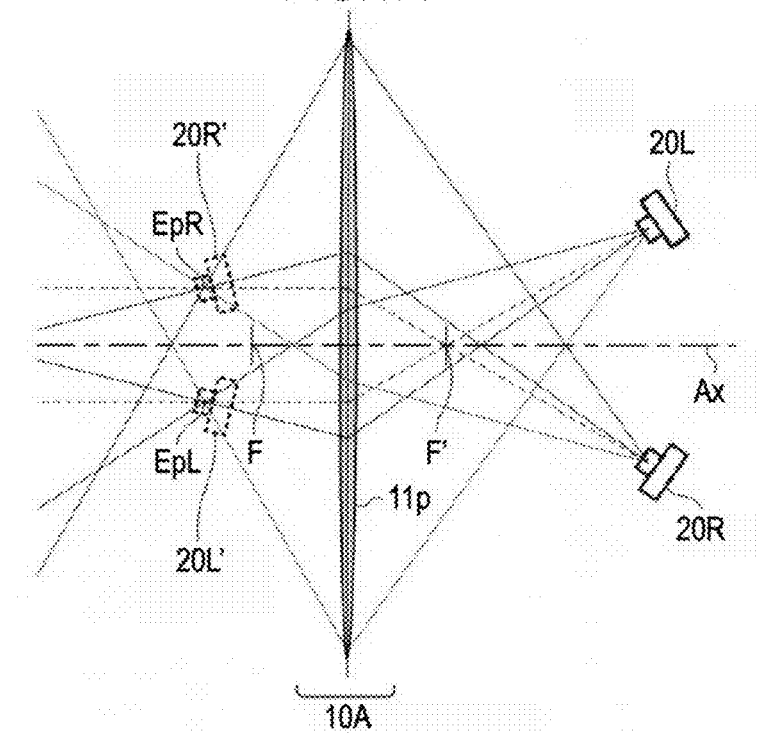
FIGS. 1A and 1B are schematic diagrams illustrating configuration examples of a stereoscopic imaging apparatus where a positive lens is used in an objective optical system in the related art.
Figure 1B:
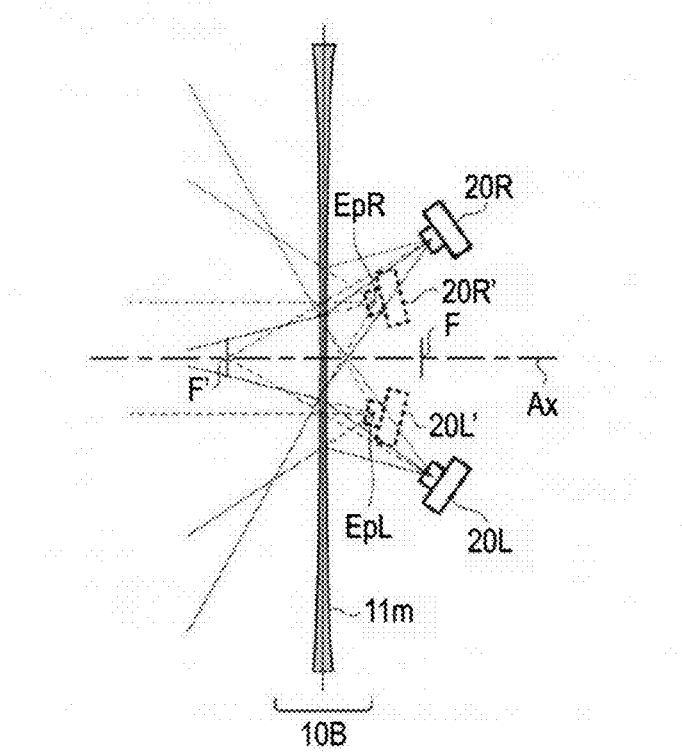

First, a description will be made of a principle where an effective pupil is formed by a stereoscopic imaging apparatus with reference to FIGS. 1A and 1B. A stereoscopic imaging apparatus 50 shown in FIGS. 1A and 1B includes an objective optical system 10, an imaging unit 20L, and an imaging unit 20R. The objective optical system 10 has a function of forming a subject (not shown) as a real image. That is to say, the objective optical system 10 is configured as a focal optical system. FIG. 1A shows an example where a positive lens (convex lens) 11$p$ having positive a refractive power is used as the objective optical system 10, and FIG. 1B shows an example where a negative lens (concave lens) 11$m$ having a negative refractive power is used as the objective optical system 10.

The imaging unit 20R and the imaging unit 20L include image forming optical systems (not shown), and the image forming optical systems form a plurality of subject light fluxes emitted from different paths of the objective optical system 10 as parallax images. In addition, the parallax images formed by the image forming optical systems are converted into image signals by imaging devices (not shown) in the imaging units 20R and 20L.

FIG. 1A is a top view where the stereoscopic imaging apparatus 50 is viewed from the top. The stereoscopic imaging apparatus 50 is disposed or held such that a horizontal direction in the disposition of pixels constituting the imaging device is parallel to the ground. In other words, the imaging unit 20L shown in the upper part in FIG. 1A is an imaging unit which generates a left eye parallax image, and the imaging unit 20R shown in the lower part is an imaging unit which generates a right eye parallax image.

The broken lines and the solid lines in FIG. 1A indicate light paths of radiated light beams when the light beams are assumed to be radiated from lens centers of the image forming optical systems (not shown) of the imaging unit 20L and the imaging unit 20R. The broken lines indicate light paths of light which are radiated from the lens centers of the image forming optical systems (not shown) of the imaging unit 20L and the imaging unit 20R and passes through a rear focal point F' of the objective optical system 10A. As indicated by the broken lines, light which is radiated from the lens centers of the left and right image forming optical systems and passes through the rear focal point F' of the objective optical system 10A is refracted by the objective optical system 10A and becomes parallel to an optical axis Ax of the objective optical system 10A.

The solid lines shown in FIG. 1A indicate light paths of light beams passing through left and right ends of angles of view of the respective image forming optical systems, of light beams radiated from the lens centers of the image forming optical systems (not shown) of the imaging unit 20L and the imaging unit 20R. The respective light beams indicated by the solid lines are refracted by the objective optical system 10A and then intersect the light beams indicated by the broken lines. That is to say, it means that all the light beams radiated from the lens centers of the image forming optical systems (not shown) of the imaging unit 20L and the imaging unit 20R necessarily pass through the intersections.

For this reason, images formed on imaging surfaces (not shown) of the imaging unit 20L and the imaging unit 20R are equivalent to images captured using the intersections as pupils. In other words, these intersections are considered as substantial pupils (effective pupils) of the stereoscopic imaging apparatus 50. Therefore, images grasped by the imaging unit 20L and the imaging unit 20R are the same images as images captured by installing cameras at the positions where the intersections are formed. In FIGS. 1A and 1B, cameras formed in this way are shown as an "effective camera 20L'" and an "effective camera 20R'".

It can be said that a distance between an effective pupil (effective pupil EpL) of the effective camera 20L' and an effective pupil (effective pupil EpR) of the effective camera 20R' is a substantial IAD (hereinafter, referred to as an "effective IAD") in the stereoscopic imaging apparatus 50. In the example shown in FIG. 1A, the effective IAD is shorter than a physical IAD defined by the disposition of the imaging unit 20R and the imaging unit 20L. In other words, with the configuration of the stereoscopic imaging apparatus 50, it is possible to make the "effective IAD" which is substantially effective IAD shorter than the physical IAD even in circumstances where a disposition gap between cameras (here, the imaging unit 20L and the imaging unit 20R) capturing left and right parallax images may not be made narrow.

Even in the configuration where the negative lens 11$m$ is used in an objective optical system 10B shown in FIG. 1B, the effective IAD can be made shorter than the physical IAD, similarly to the configuration shown in FIG. 1A.

Figure 2A:
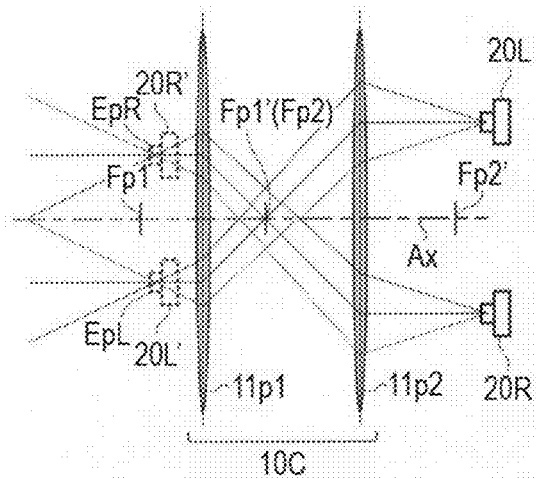
FIGS. 2A to 2C are schematic diagrams illustrating configuration examples of a stereoscopic imaging apparatus where a negative lens is used in an objective optical system in the related art, where
Figure 2B:
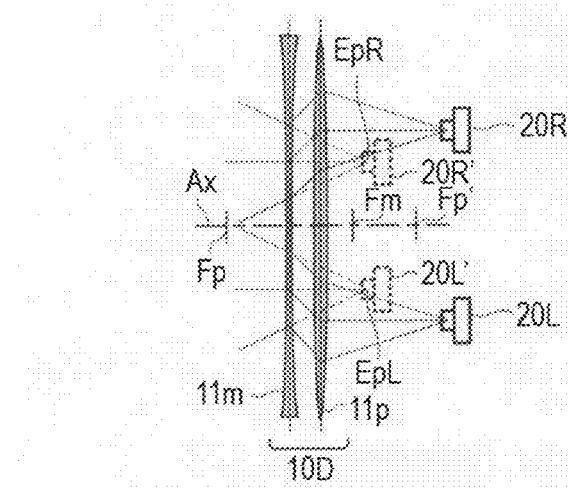
Figure 2C:
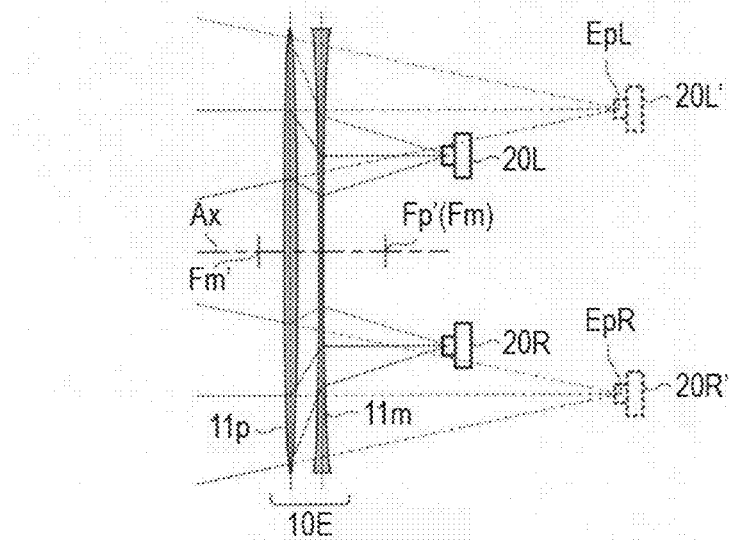

FIGS. 2A to 2C are diagrams illustrating a positional relationships between the imaging unit 20L and the imaging unit 20R and the effective camera 20L' and the effective camera 20R' corresponding thereto when an objective optical system 10C to an objective optical system 10E are configured as an afocal optical system. In FIGS. 2A to 2C, the parts corresponding to FIGS. 1A and 1B are given the same reference numerals and repeated description will be omitted. In addition, in the following description, in a case where differentiation between the objective optical systems 10 is not necessary, they are simply referred to as an "objective optical system 10" or "objective optical systems 10".

FIG. 2A is a diagram illustrating an example where the objective optical system 10C is constituted by two positive lenses (a positive lens 11$p$1 and a positive lens 11$p$2), and FIG. 2B is a diagram illustrating an example where the objective optical system 10D is constituted by a negative lens 11$m$ and a positive lens 11$p$ and the negative lens 11$m$ is disposed on the subject side. FIG. 2C is a diagram illustrating an example where the objective optical system 10E is constituted by the positive lens 11$p$ and the negative lens 11$m$ and the positive lens 11$p$ is disposed on the subject side.

In any configuration, the imaging unit 20L and the imaging unit 20R are disposed such that each optical axis thereof is parallel to the optical axis Ax of the objective optical system 10. In addition, the lenses constituting the objective optical system 10 are disposed at positions where a gap between the lenses becomes a sum of the focal lengths of the lenses (becomes a confocal point). In the example shown in FIG. 2A, a rear focal point Fp1' of the positive lens 11$p$1 and a position of the positive lens 11$p$2 are adjusted such that the rear focal point Fp1' of the positive lens 11$p$1 and a front focal point Fp2 of the positive lens 11$p$2 are located at the same position. With this disposition, an afocal optical system is realized. That is to say, light beams incident in parallel to the positive lens 11$p$1 disposed on the subject side are emitted as parallel light from the positive lens 11$p$2 disposed on the imaging units 20 side.

Assuming that light beams are emitted from the lens centers of the imaging unit 20L and the imaging unit 20R, the objective optical system 10 configured as the afocal optical system has a function of converting a gap between the light beams, that is, parallel light beams into a different gap. A variable magnification ratio of the parallel light beams converted by the afocal optical system can be changed by making a configuration of the lenses constituting the objective optical system 10 different. When the objective optical system 10 is configured as the afocal optical system, the effective pupil EpL and the effective pupil EpR are formed on the parallel light beams of which the magnification is converted by the objective optical system 10. Therefore, by changing a configuration of each lens constituting the objective optical system 10, it is possible to make the effective IAD which is a gap between the effective pupil EpL and the effective pupil EpR shorter than the physical IAD or conversely longer than that.

In the configuration where the objective optical system 10 is disposed at the position where the two positive lenses 11p form a confocal point relationship as shown in FIG. 2A, or in the configuration where the positive lens 11p is disposed on the rear side (the imaging unit 20 side) of the negative lens 11m as shown in FIG. 2B, the effective IAD can be made shorter than the physical IAD. In the configuration where the negative lens 11m is disposed on the rear side of the positive lens 11p as shown in FIG. 2C, the effective IAD can be made longer than the physical IAD.

However, in any configuration, as shown in each figure, light paths of light beams incident to the imaging unit 20L and the imaging unit 20R are different since the light paths pass around the center of the objective optical system 10 and pass through the ends (outsides) thereof. Specifically, the light paths passing through the ends (outsides) are longer than the light paths passing around the center. For this reason, in the left eye parallax image shown in FIG. 20A, appearance of distortion aberration increases toward the left side of the screen, and, in the right eye parallax image shown in FIG. 20B, appearance of distortion aberration increases toward the right side thereof.

In order to reduce adverse effects which the distortion aberration exerts on forming of stereoscopic vision, the stereoscopic imaging apparatus according to an embodiment of the present disclosure uses lenses of an anamorphic optical system as lenses of the objective optical system. The anamorphic optical system is an optical system where refractive indexes of light in the longitudinal direction and transverse direction are different, and are used for cinematography in many cases. In the cases of being used as cinematography, the anamorphic optical system is used when images which are transversely long in the width of a wide screen for cinema are compressed in the transverse direction so as to suitable for the frame width of a film and when the recorded images compressed return to the size of the original wide screen and are projected. As a lens with the simplest configuration, there is known a cylindrical lens which is in a shape where a column is cut and has a direction where light is refracted and a direction where light is not refracted. Further, the objective optical system may have a direction along which light is refracted and a direction along which light is refracted differently.

2. First Embodiment

2-1. Configuration Example of Stereoscopic Imaging Apparatus

Next, a configuration example of a stereoscopic imaging apparatus 1 according to the first embodiment of the present disclosure will be described with reference to FIG. 3. The stereoscopic imaging apparatus 1 includes an objective optical system 100, an imaging unit 200L, and an imaging unit 200R. In the present embodiment, the objective optical system 100 is configured as an afocal optical system, and the objective optical system 100 is an optical system which incorporates light beams emitted from a subject and guides the light beams to a subsequent stage. The light beams incident as parallel light are emitted as parallel light. The respective lenses constituting the afocal optical system use cylindrical lenses which are lenses of the anamorphic optical system. Details of the configuration of the objective optical system 100 will be described later with reference to FIGS. 4 to 7B.

The imaging unit 200L includes an image forming optical system 201L and an imaging device 202L, and the imaging unit 200R includes an image forming optical system 201R and an imaging device 202R. The image forming optical system 201L and the image forming optical system 201R form a plurality of subject light fluxes emitted from different light paths of the objective optical system 100 as parallax images. The imaging device 202L and the imaging device 202R include a plurality of pixels disposed in the horizontal direction and the vertical direction, and each of the plurality of pixels converts the parallax image formed by the image forming optical system 201L or the image forming optical system 201R into an image signal so as to be output.

The imaging unit 200L and the imaging unit 200R are disposed at positions where the optical axes thereof are parallel to the optical axis Ax of the objective optical system 100, and are disposed so as to be symmetric to each other with respect to the optical axis Ax of the objective optical system 100.

In addition, the stereoscopic imaging apparatus 1 includes a signal processing unit 300L, a signal processing unit 300R, an image processing unit 400, a control unit 500, an operation unit 600, and a storage unit 700. The signal processing unit 300L and the signal processing unit 300R performs signal processes such as CDS (Correlated Double Sampling), AGC (Automatic Gain Control), AWB (Automatic White Balance), and AIC (Automatic Iris Control), for an image signal output from the imaging device 202L or the imaging device 202R.

The image processing unit 400 adjusts optical axis deviation, color deviation or phase deviation in a left or right parallax image output from the imaging device 202L or the imaging device 202R. The control unit 500 is constituted by a CPU (Central Processing Unit) or the like and controls the respective units constituting the stereoscopic imaging apparatus 1. In some cases, a predetermined image process is performed for image data stored in the storage unit 700 described later.

The operation unit 600 includes an operation input portion (not shown) constituted by buttons, knobs, or switches, and generates and outputs an operation signal responding to an operation performed on the operation input portion. The storage unit 700 is constituted by a nonvolatile memory or the like, and pixel information and the like included in a pixel signal is accumulated in or read from the storage unit 700 or image data is accumulated therein. In addition, the storage unit 700 may be disposed inside the signal processing unit 300L and the signal processing unit 300R, or inside the image processing unit 400, and thereby may store data which is not referred to by other circuits or may be used as a cache for realizing high speed access.

2-2. Configuration Example of Objective Optical System

Figure 4:
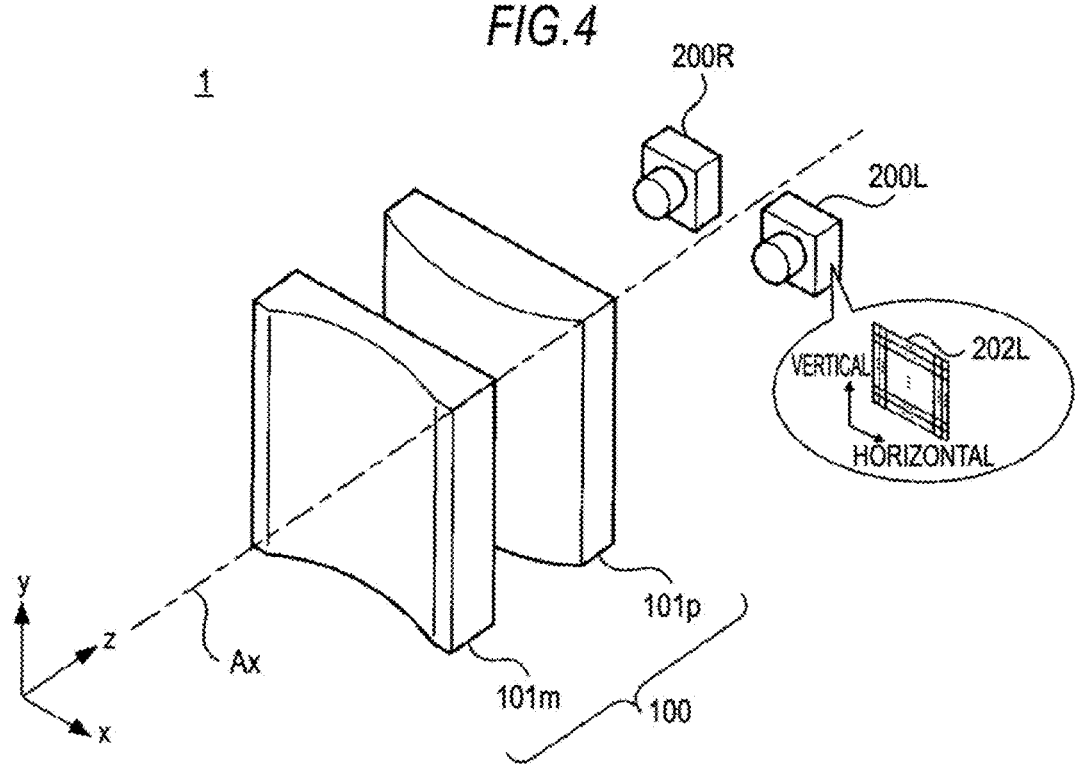
FIG. 4 is a perspective view illustrating the configuration example of the stereoscopic imaging apparatus according to the first embodiment of the present disclosure.

Next, details of the configuration of the objective optical system 100 will be described with reference to FIGS. 4 to 7B. FIG. 4 is a perspective view illustrating an example of the disposition of the objective optical system 100, the imaging unit 200L, and the imaging unit 200R, and shows an example where the stereoscopic imaging apparatus 1 is viewed diagonally to the right from the front upper side (subject side). As shown in FIG. 4, the objective optical system 100 is constituted by a negative cylindrical lens (hereinafter, simply referred to as a "negative lens") 101m with a negative refractive power and a positive cylindrical lens (hereinafter, referred to as a "positive lens") 101p with a positive refractive power. In FIG. 4, a direction of the optical axis Ax of the objective optical system 100 is indicated as the z axis, and the horizontal direction and the vertical direction in pixels constituting the imaging device 202L (and the imaging device 202R) are respectively indicated as the x axis and the y axis.

FIGS. 5A to 6C show configuration examples of the negative lens 101m and the positive lens 101p. The negative lens 101m shown in FIG. 5A has a cross-section (hereinafter, referred to as an "ab cross-section") including a line segment drawn in the x axis direction, connecting "a" and "b" in the figure and a cross-section (hereinafter, referred to as a "cd cross-section") including a line segment drawn in the y axis direction, connecting "c" and "d" in the figure. FIG. 5B shows the ab cross-section of the negative lens 101m, and FIG. 5C shows the cd cross-section thereof.

Figure 5A:
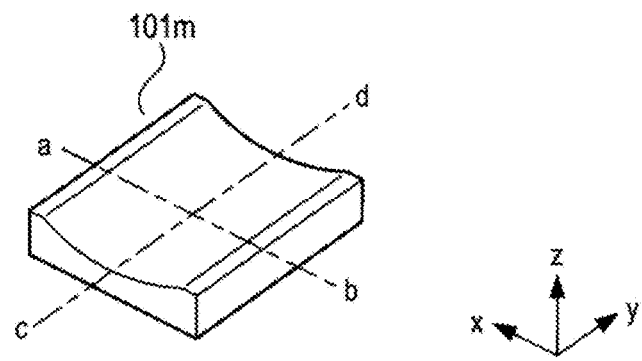
FIGS. 5A to 5C are diagrams illustrating optical characteristics of a negative cylindrical lens, where
Figure 5B:
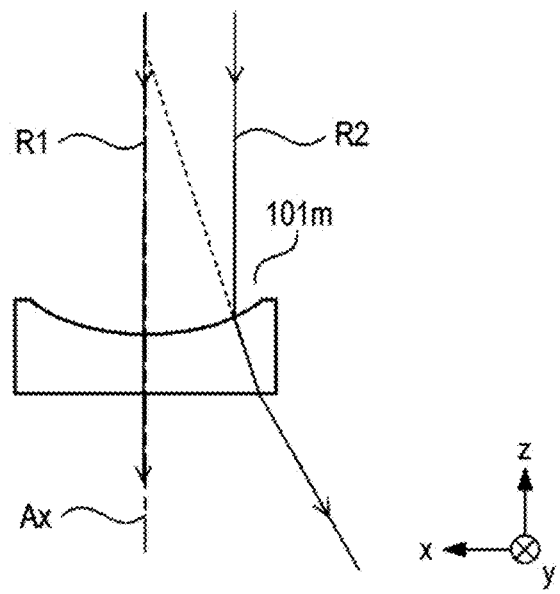

Among the light beams incident on the ab cross-section shown in FIG. 5B, a light beam R1 incident along the optical axis of the negative lens 101m goes straight as it is, and a light beam R2 incident on the other parts of the ab cross-section is refracted by the negative lens 101m and travels so as to spread outwards.

Figure 5C:
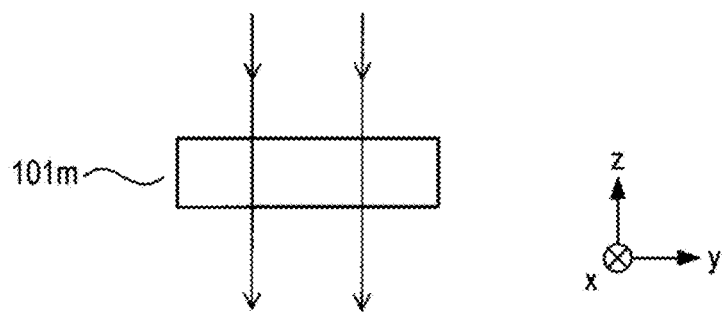

The cd cross-section shown in FIG. 5C does not include a curved surface and thus does not have a lens operation. Therefore, light beams incident along this cross-section all go straight. In addition, although FIGS. 5A to 5C show an example where one surface of the negative lens 101m has a curved surface (concave surface), the present disclosure is not limited thereto, and a negative lens of which both surfaces are curved may be used.

Figure 6A:
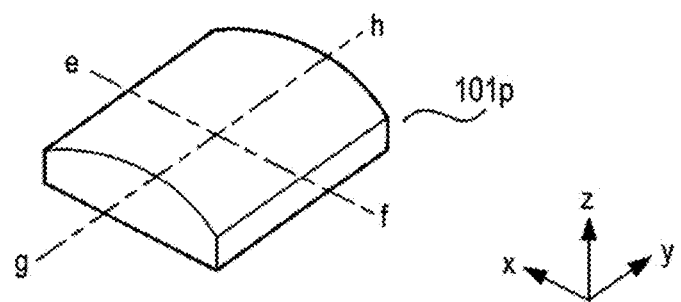
FIGS. 6A to 6C are diagrams illustrating optical characteristics of a positive cylindrical lens, where
Figure 6B:
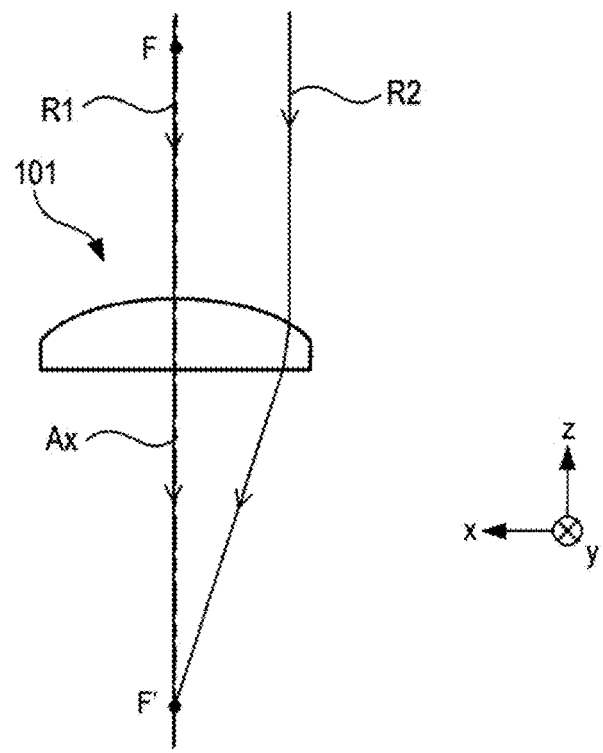
Figure 6C:
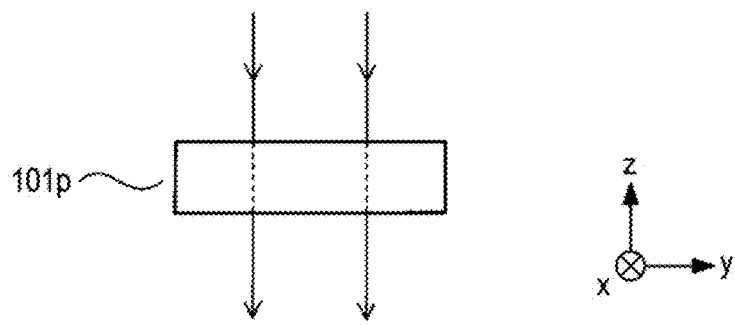

The positive lens 101p shown in FIG. 6A has a cross-section (hereinafter, referred to as an "ef cross-section") including a line segment drawn in the x axis direction, connecting "e" and "f" in the figure and a cross-section (hereinafter, referred to as a "gh cross-section") including a line segment drawn in the y axis direction, connecting "g" and "h" in the figure. FIG. 6B shows the ef cross-section of the positive lens 101p, and FIG. 6C shows the gh cross-section thereof.

Among the light beams incident on the ef cross-section shown in FIG. 6B, the light beam R1 incident along the optical axis of the positive lens 101p goes straight as it is, and the light beam R2 incident on the other parts of the ef cross-section is refracted and is collected at the rear focal point F' of the positive lens 101p. The gh cross-section shown in FIG. 6C does not include a curved surface and thus does not have a lens operation. Therefore, light beams incident along this cross-section all go straight. In other words, it can be seen that the negative lens 101m and the positive lens 101p constituted by the cylindrical lenses shown in FIGS. 5A to 6C have a second refractive power in the y axis direction which is a second direction lower than a first refractive power in the x axis direction which is a first direction.

As shown in FIG. 4, by disposing the negative lens 101m and the positive lens 101p such that x axis directions thereof match with the disposition directions of the imaging unit 200L and the imaging unit 200R, only light beams which are incident so as to be parallel to each lens are refracted. In the example shown in FIG. 4, the imaging unit 200L and the imaging unit 200R are disposed so as to be arranged in the horizontal direction, and thus the disposition directions of the imaging unit 200L and the imaging unit 200R match with the horizontal direction in the disposition of the respective pixels constituting the imaging devices. With this disposition, refraction in the objective optical system 100 does not occur in the longitudinal direction of an image.

FIG. 7A is a top view where the stereoscopic imaging apparatus 1 is viewed from the top, and FIG. 7B is a side view where the stereoscopic imaging apparatus 1 is viewed from the left side (side where the imaging device 202L is disposed). In the present embodiment, as shown in FIG. 7A, the negative lens 101m and the positive lens 101p constituting the objective optical system 100 are disposed such that a rear focal point Fm' of the negative lens 101m and a front focal point Fp of the positive lens 101p are located at the same position. With this configuration, light beams incident in parallel to the optical axis Ax of the objective optical system 100 are refracted by the negative lens 101m and the positive lens 101p and are emitted as parallel light again.

In addition, light beams which are incident on the negative lens 101m with an angle and reach a main plane of the negative lens 101m, are then refracted by the negative lens 101m and travel in a direction spreading outwards. Among these light beams, an effective pupil EpR and an effective pupil EpL are formed at positions where the light beams which are incident on the negative lens 101m and reach the main plane of the negative lens 101m extend as they are. In addition, images formed on imaging surfaces (not shown) of the imaging unit 200L and the imaging unit 200R are equivalent to images captured by disposing the cameras (an effective camera 200L' and an effective camera 200R') at the positions where the effective pupil EpL and the effective pupil EpR are formed.

In the example shown in FIG. 7A, in the same manner as the configuration in the related art shown in FIG. 2B, it can be seen that the effective IAD which is a gap between the effective pupil EpL and the effective pupil EpR is shorter than the physical IAD defined by an actual disposition gap between the imaging unit 200L and the imaging unit 200R. That is to say, images which are incident on the objective optical system 100 configured as an anamorphic optical system and are generated by the imaging unit 200L and the imaging unit 200R are reduced in the transverse direction.

On the other hand, as shown in FIG. 7B, the light paths of light beams passing through the respective lenses of the objective optical system 100 when the objective optical system 100 is viewed from the side surface are different from those in the configuration in the related art shown in FIG. 2B. In the stereoscopic imaging apparatus 1 according to the first embodiment of the present disclosure, since the objective optical system 100 is configured as an anamorphic optical system, as shown in FIG. 5B, the light beams incident to the objective optical system 100 in the y axis direction (longitudinal direction) are not refracted but go straight. In other words, the light beams incident in the longitudinal direction are not refracted since the objective optical system 100 configured as an anamorphic optical system is equivalent to a thin plate glass. Therefore, the longitudinal direction of the images which are incident on the objective optical system 100 and are generated by the imaging unit 200L and the imaging unit 200R is not variably magnified but kept unmagnified.

FIGS. 8A and 8B schematically show images of capturing results when a lattice pattern with the same interval is captured by the stereoscopic imaging apparatus 1 shown in FIGS. 7A and 7B. As described above, since the light beams incident on the objective optical system 100 in the longitudinal direction are not refracted, the interval of the lattice pattern in the longitudinal direction in the captured images is in a state of being unmagnified by the objective optical system 100, that is, is an interval equivalent to that in images captured in a state of excluding the objective optical system 100.

On the other hand, since the transverse direction of the images is influenced by the refraction in the objective optical system 100, the width of the lattice pattern in the transverse direction is reduced. However, in the images shown in FIGS. 8A and 8B, the lattice patterns have unequal intervals due to influence of aberration on account of assuming that the whole distortion aberration of the objective optical system 100 may not be optically corrected. Specifically, on account of assuming that distortion aberration equivalent to barrel aberration in a spherical lens is generated, lattice intervals are slightly narrower in the left end of the left image and the right end of the right image on which the aberration exerts greater effects.

As described above, however, a lens operation does not work in the longitudinal direction of the images captured by the stereoscopic imaging apparatus 1, and thus position deviation does not occur in the left and right parallax images in the longitudinal (vertical) direction. If corresponding pixels in the left and right parallax images are deviated in the longitudinal direction, it is regarded that a viewer feels fatigue or discomfort during stereoscopic vision. In the example where a spherical lens is used in the objective optical system as shown in FIGS. 20A and 20B, since distortion is different in the left and right parallax images, longitudinal deviation at the both ends of the screen increases, which exerts adverse effects on forming of stereoscopic vision. In contrast, since the objective optical system 100 is configured as an anamorphic optical system in the stereoscopic imaging apparatus 1 according to the first embodiment of the present disclosure, aberration in the transverse direction and aberration in the longitudinal direction in the left and right parallax images can be separated. Thereby, it is possible to suppress distortion aberration generated in a tilt direction. As a result, it is possible to remove position deviation of corresponding points in the left and right parallax images in the vertical direction which is problematic when performing stereoscopic vision.

In addition, according to the present embodiment, since position deviation in the vertical direction between the left and right parallax images is removed, there is no necessity of increasing capacity of line memories for correcting aberration in the longitudinal direction. In addition, since aberration in the transverse direction and aberration in the longitudinal direction in the left and right parallax images can be separated, distortion aberration or chromatic aberration of magnification of the objective optical system 100 can be easily corrected in terms of image processes. In other words, since a range capable of correcting this aberration through image processes can be widened, there is no necessity of designing a dedicated lens for preventing distortion aberration or chromatic aberration of magnification. Thereby, it is possible to suppress lenses from being large-sized and a plurality of lenses from being used, and thereby it is possible to suppress increases in bulk of the optical system and manufacturing costs.

3. Modified Example of First Embodiment

Although, in the above-described first embodiment, the description has been made of an example where adverse effects in which distortion aberration exerts on forming of stereoscopic vision are reduced by configuring the objective optical system 100 as an anamorphic optical system, to change the way of appearance of the distortion aberration, the present disclosure is not limited thereto. A signal process or an image process for suppressing distortion aberration, or a signal process or an image process for correcting aspect ratios in parallax images may be performed.

A stereoscopic imaging apparatus 1a shown in FIG. 9 performs a signal process or an image process for suppressing distortion aberration, or a signal process or an image process for correcting aspect ratios in parallax images. In FIG. 9, the parts corresponding to FIG. 3 are given the same reference numerals and repeated description will be omitted. In the stereoscopic imaging apparatus 1a shown in FIG. 9, a difference from the stereoscopic imaging apparatus 1 shown in FIG. 3 is that a signal processing unit 300La and a signal processing unit 300Ra perform an aberration correcting process, a longitudinal and transverse axes deviation detecting unit 800 is provided, and an image processing unit 400a performs an aspect correcting process. In addition, there is also a difference in a configuration of a storage unit 700a.

First, a configuration of the storage unit 700a will be described. The storage unit 700a includes an expected image storage portion 701, an observed image holding portion 702, and a correction parameter storage portion 703. The expected image storage portion 701 stores an expected image Ie for reference which is an image expected to be captured in a state where aberration is not generated.

The expected image Ie is obtained by preparing for an image where the same pattern appears regularly with equal intervals such as, for example, a lattice pattern, a polka-dot pattern or a check pattern as a reference image Ir and generating data of the reference image Ir. An image prepared as the reference image Ir is preferably an image having such a regular pattern; however, other images such as a scene image may be used. Alternatively, in an observed image Io obtained by capturing the reference image Ir by the stereoscopic imaging apparatus 1, data of a region having small aberration is extracted and data of the other regions is estimated from the data, thereby generating the expected image Ie.

The observed image holding portion 702 holds the observed image Io obtained by capturing the reference image Ir by the stereoscopic imaging apparatus 1. The correction parameter storage portion 703 stores an aberration correcting parameter calculated by the control unit 500. The aberration correcting parameter is obtained by correlating correction values (R, G and B values) for each pixel forming an image with positional information of the pixel in a form of a correction table. The signal processing unit 300La and the signal processing unit 300Ra compare and analyze the expected image Ie and the observed image Io, thereby generating the aberration correcting parameter.

If an image where an interval of a pattern is equal in the longitudinal direction and the transverse direction is prepared as the reference image Ir, that is, an image which does not include distortion aberration in the same aspect ratio is prepared, an expected image Ie generated from the reference image Ir does not also include distortion aberration in the same aspect ratio. Aberration is corrected by the use of the correcting parameter generated by comparing and analyzing the expected image Ie and the observed image Io, and thereby it is possible to correct distortion aberration and an aspect ratio together.

In addition, although a case where color values of only R, G and B are used as correction values is exemplified here, the present disclosure is not limited thereto. For example, correction values may be referred to by also using color values of pixels adjacent to a pixel which is a target for referring to a correction value. Further, correction tables for all the pixels forming an image may not be provided. For example, reference positions may be held every ten pixels, and a position of a pixel before being corrected may be calculated for each pixel by interpolating the reference positions of the correction tables when the correction is performed.

The signal processing unit 300La and the signal processing unit 300Ra perform an aberration correcting process ofr an image signal output from the imaging device 202L or the imaging device 202R by the use of the aberration correcting parameter stored in the correction parameter storage portion 703. In addition, although, in the present embodiment, an example where the aberration correcting process is performed for left and right image signals separately from each other by the signal processing unit 300La and the signal processing unit 300Ra has been described, the aberration correcting process may be performed by the image processing unit 400a. Further, generation of the aberration correcting parameter is performed not by the signal processing unit 300La and the signal processing unit 300Ra but by the image processing unit 400a.

The longitudinal and transverse axes deviation detecting unit 800 determines whether or not the longitudinal and transverse axes of each lens of the objective optical system 100 match with longitudinal and transverse axes of the observed image Io, and detects a deviation amount thereof if they do not match with each other.

If the longitudinal and transverse axes deviation detecting unit 800 detects deviation of the longitudinal and transverse axes, the image processing unit 400a performs a process for removing the deviation. Specifically, for example, by performing affine transform, the longitudinal and transverse axes of the observed image Io are made to match with the longitudinal and transverse axes of each lens of the objective optical system 100. Alternatively, a driving mechanism which can physically drive the objective optical system 100 in a rotation direction with respect to the optical axis may be provided, and the longitudinal and transverse axes of each lens of the objective optical system 100 may be made to match with the longitudinal and transverse axes of the observed image Io by rotating the objective optical system 100 with the driving mechanism.

Figure 10:
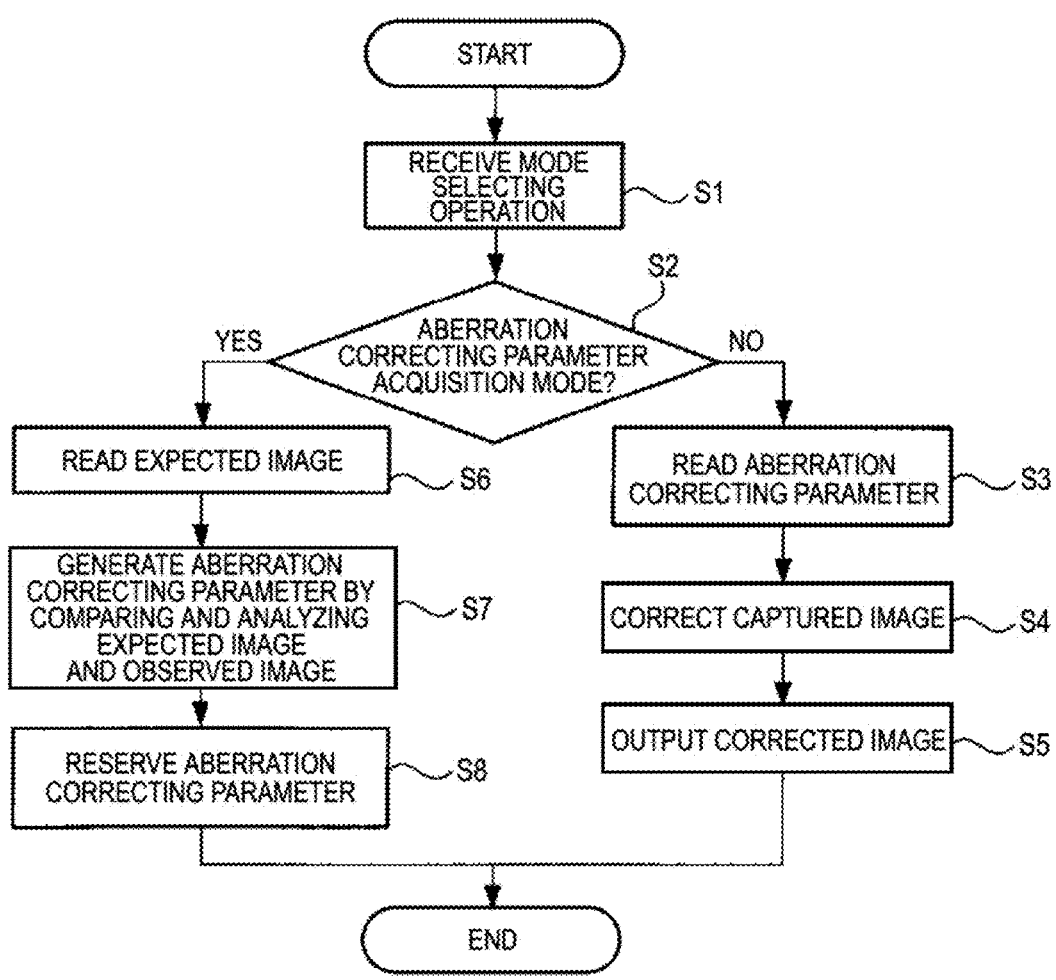
FIG. 10 is a flowchart illustrating an example of an aberration correcting process according to a modified example of the first embodiment of the present disclosure.

The stereoscopic imaging apparatus 1a according to the present embodiment includes two modes, an "aberration correcting parameter acquisition mode" for acquiring an aberration correcting parameter, and a "correction mode" for correcting aberration. The two modes are selected by a user via the operation unit 600. FIG. 10 is a flowchart illustrating an example of the correction process when these modes are selected.

First, if an operation for selecting either of the modes is input by a user (step S1), the signal processing unit 300La and the signal processing unit 300Ra (refer to FIG. 3) determines whether or not the selected mode is the "aberration correcting parameter acquisition mode" (step S2). If the selected mode is not the "aberration correcting parameter acquisition mode", that is, if it is the "correction mode", an aberration correcting parameter is read from the correction parameter storage portion 703 (refer to FIG. 9) (step S3). In addition, the signal processing unit 300La and the signal processing unit 300Ra or the image processing unit 400a correct(s) aberration of a captured image (step S4), and the corrected image is output (step S5).

In step S2, if it is determined that the mode selected by the user is the "aberration correcting parameter acquisition mode", the signal processing unit 300La and the signal processing unit 300Ra read the expected image Ie from the expected image storage portion 701 (step S6). Next, the signal processing unit 300La and the signal processing unit 300Ra compare and analyze the read expected image Ie and an observed image Io obtained through capture, and generate an aberration correcting parameter on the basis of the analysis result (step S7). In addition, the generated aberration correcting parameter is stored in the correction parameter storage portion 703 (step S8).

As such, the correction of aberration of the objective optical system 100 is performed through the signal process or the image process, and thereby it is possible to remove position deviation of a captured image in the transverse direction occurring due to the aberration. In addition, by correcting aberration of the objective optical system 100 through the signal process or the image process, it is possible to improve a degree of freedom in an optical design of the objective optical system 100. Further, since a user side acquires an aberration correcting parameter, the user can appropriately perform correction even in a case where the form of aberration is varied due to aged deterioration.

In addition, although, in the present embodiment, an example where a user can select the "aberration correcting parameter acquisition mode" and the "correction mode" has been described, the present disclosure is not limited thereto. There may be a configuration where acquisition of a parameter in the "aberration correcting parameter acquisition mode" is performed before the factory shipment, and a user may not correct the parameter.

4. Second Embodiment

Next, a second embodiment of the present disclosure will be described with reference to FIGS. 11A and 11B. In the stereoscopic imaging apparatus 1 (1a) described in the first embodiment or the modified example thereof, the objective optical system 100 is configured as an anamorphic optical system, and thereby it is possible to remove position deviation in the vertical direction of corresponding points of left and right parallax images. However, there is a problem in that a field angle of the effective camera 200L' (200R') which is virtually formed at the position of the effective pupil EpL (EpR) becomes wider than a field angle of the actual imaging unit 200L (200R).

In order to solve the problem, a stereoscopic imaging apparatus 1b according to the present embodiment includes not only a first objective optical system which covers both a field angle of the imaging unit 200L and a field angle of the imaging unit 200R but also a second objective optical system corresponding to each image forming optical system 201. Both the first objective optical system and the second objective optical system are configured as an anamorphic optical system. In addition, a disposition of lenses constituting the second objective optical system is reverse to a disposition of lenses constituting the first objective optical system, and, afocal magnification of the second objective optical system is a reciprocal of afocal magnification of the first objective optical system. In addition, the "afocal magnification" described here indicates a ratio of focal lengths of two lenses.

Figure 11A:
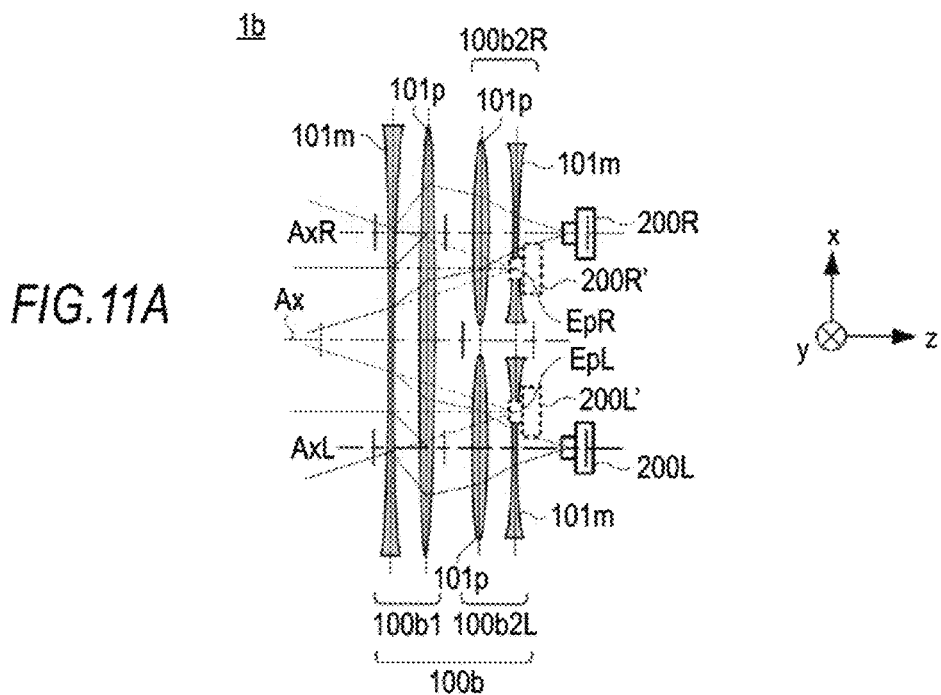
FIGS. 11A and 11B are schematic diagrams illustrating a configuration example of a stereoscopic imaging apparatus according to a second embodiment of the present disclosure, where
Figure 11B:
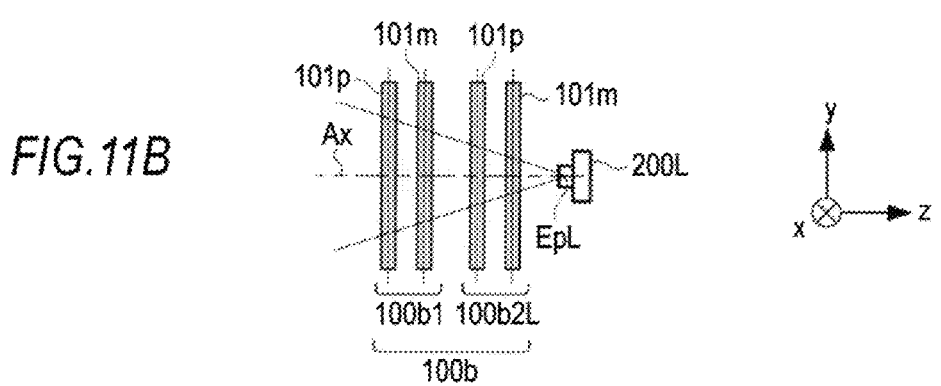

FIG. 11A is a top view where the stereoscopic imaging apparatus 1b is viewed from the top, and FIG. 11B is a side view where the stereoscopic imaging apparatus 1b is viewed from the left side (side where the imaging device 202L is disposed). In FIGS. 11A and 11B, the parts corresponding to FIGS. 7A and 7B are given the same reference numerals. As shown in FIG. 11A, the stereoscopic imaging apparatus 1b includes an objective optical system 100b, an imaging unit 200L, and an imaging unit 200R.

The objective optical system 100b is constituted by a first objective optical system 100b1, a second objective optical system 100b2L, and a second objective optical system 100b2R. The first objective optical system 100b1 includes a negative lens 101m and a positive lens 101p, the negative lens 101m is disposed on a subject side (not shown), and the positive lens 101p is disposed on the rear side thereof (an emission side of subject light). A configuration of the first objective optical system 100b1 is the same as that of the objective optical system 100 shown in FIG. 7A.

The first objective optical system 100b1 is disposed at the previous stage of the imaging unit 200L and the imaging unit 200R, and thereby an effective pupil EpL and an effective pupil EpR are formed in the same manner as the configuration shown in FIG. 7A. In addition, the effective IAD which is a gap between the effective pupil EpL and the effective pupil EpR is shorter than the physical IAD defined by the disposition of the imaging unit 200L and the imaging unit 200R. In other words, the first objective optical system 100b1 is disposed at the previous stage of the imaging unit 200L and the imaging unit 200R, and thereby it is possible to achieve the same effect as in the configuration shown in FIGS. 7A and 7B.

In the present embodiment, the second objective optical system is provided on the rear side of the first objective optical system 100b1. The second objective optical system is constituted by the second objective optical system 100b2L installed so as to correspond to an image forming optical system (not shown) in the imaging unit 200L and the second objective optical system 100b2R installed so as to correspond to an image forming optical system (not shown) in the imaging unit 200R. The second objective optical system 100b2L and the second objective optical system 100b2R are disposed such that lens centers thereof are respectively located on an optical axis AxL and an optical axis AxR of the image forming optical systems (not shown) of the imaging unit 200L and the imaging unit 200R.

The second objective optical system 100b2L and the second objective optical system 100b2R are respectively constituted by a positive lens 101p and a negative lens 101m, and the positive lens 101p is disposed on the subject side (not shown), and the negative lens 101m is disposed on the rear side thereof.

In addition, in the second objective optical system 100b2L and the second objective optical system 100b2R, the disposition in the optical axis direction of the lenses constituting each of them is reverse to the disposition of the lenses constituting the first objective optical system 100b1. In other words, the positive lens 101p is disposed on the subject side, and the negative lens 101m is disposed on the imaging units 200 side. With this disposition, magnification of the second objective optical system 100b2L and the second objective optical system 100b2R is a reciprocal of magnification of the first objective optical system 100b1. As a result, a field angle, which is slightly spread, of the effective camera 200L' or the effective camera 200R' is narrowed by a lens operation of the first objective optical system 100b1, and thus becomes approximately the same as a field angle of the imaging unit 200L or the imaging unit 200R.

In addition, in the present embodiment as well, the objective optical system 100b, constituted by the first objective optical system 100b1, the second objective optical system 100b2L, and the second objective optical system 100b2R, is configured as an anamorphic optical system. In addition, the negative lens 101m and the positive lens 101p constituting each objective optical system are disposed such that the x axis direction thereof matches with the horizontal direction in the disposition of the pixels of the imaging device (not shown).

Thereby, as shown in FIG. 11B, light beams incident on the objective optical system 100b in the longitudinal direction (the y axis direction in the figure) are not refracted but go straight. In other words, the light beams incident in the longitudinal direction are not refracted since each objective optical system configured as an anamorphic optical system is equivalent to a thin plate glass. The longitudinal direction of images generated by the imaging unit 200L and the imaging unit 200R is not variably magnified but kept unmagnified.

Figure 12A:
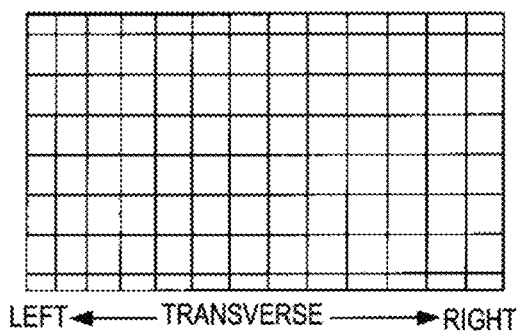
FIGS. 12A and 12B are diagrams illustrating examples of left and light parallax images captured by the stereoscopic imaging apparatus according to the second embodiment of the present disclosure, where
Figure 12B:
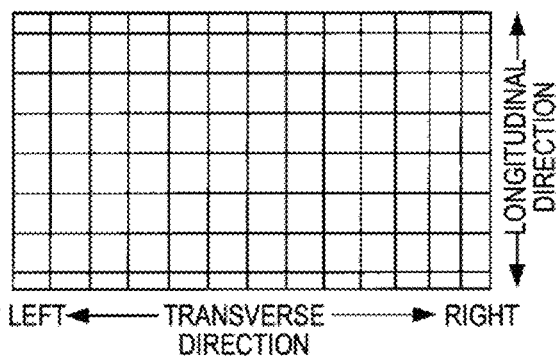

FIGS. 12A and 12B schematically show images of capturing results when a lattice pattern with the same interval is captured by the stereoscopic imaging apparatus 1b shown in FIGS. 11A and 11B. FIG. 12A shows a left eye parallax image, and FIG. 12B shows a right eye parallax image. As described above, since the light beams incident on the objective optical system 100b in the longitudinal direction are not refracted, the interval of the lattice pattern in the longitudinal direction in the captured images is an interval equivalent to that in images captured in a state of excluding the objective optical system 100b.

On the other hand, since the transverse direction of the images is influenced by the refraction in the first objective optical system 100b1, the width of the lattice pattern in the transverse direction is temporarily reduced. However, thereafter, since the light beams pass through the second objective optical system 100b2R and the second objective optical system 100b2L, the width of the lattice pattern in the transverse direction is an interval equivalent to that in images captured in a state of excluding the first objective optical system 100b1.

In addition, in the images shown in FIGS. 12A and 12B, the lattice pattern has unequal intervals due to influence of aberration on account of assuming that the whole distortion aberration of the objective optical system 100b may not be optically corrected. Specifically, on account of assuming that distortion aberration equivalent to barrel aberration in a spherical lens is generated, lattice intervals are slightly narrower in the left end of the left image and the right end of the right image on which the aberration exerts greater effects.

Figure 3:
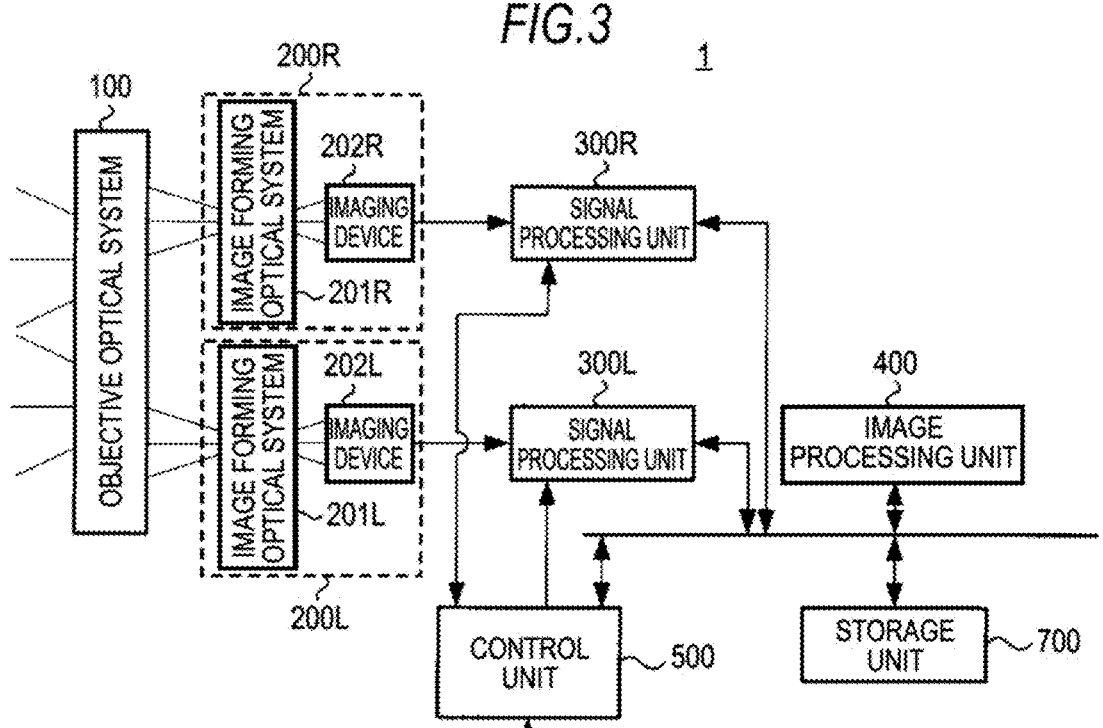
FIG. 3 is a block diagram illustrating a configuration example of a stereoscopic imaging apparatus according to a first embodiment of the present disclosure.

Configurations of the other blocks of the stereoscopic imaging apparatus 1b may be the configurations shown in FIG. 3, or may be the configurations shown in FIG. 9 such that correction of aberration is performed in terms of a signal. However, in the present embodiment, since an aspect ratio of an image is not varied by light beams passing through the objective optical system 100*b*, it is not necessary to correct an aspect ratio even if the configuration shown in FIG. 9 is applied.

According to the above-described second embodiment, it is possible to achieve effects equivalent to the effects achieved by the first embodiment. In addition thereto, it is possible to achieve an effect that field angles of the effective camera 200L' and the effective camera 200R' formed by the first objective optical system 100*b*1 is substantially the same as field angles of the imaging unit 200L and the imaging unit 200R.

5. Third Embodiment

Next, a third embodiment of the present disclosure will be described with reference to FIG. 13 to FIG. 14B. In the present embodiment, in order to make aspect ratios in parallax images substantially the same in a state where a field angle of the imaging units 200 is widened, a disposition direction of a second objective optical system 100*c*2 is rotated by 90° with respect to a disposition direction of a first objective optical system 100*c*1. Before description of a configuration of a stereoscopic imaging apparatus 1*c* according to the present embodiment, a principle thereof will be described with reference to FIG. 13.

Figure 13:
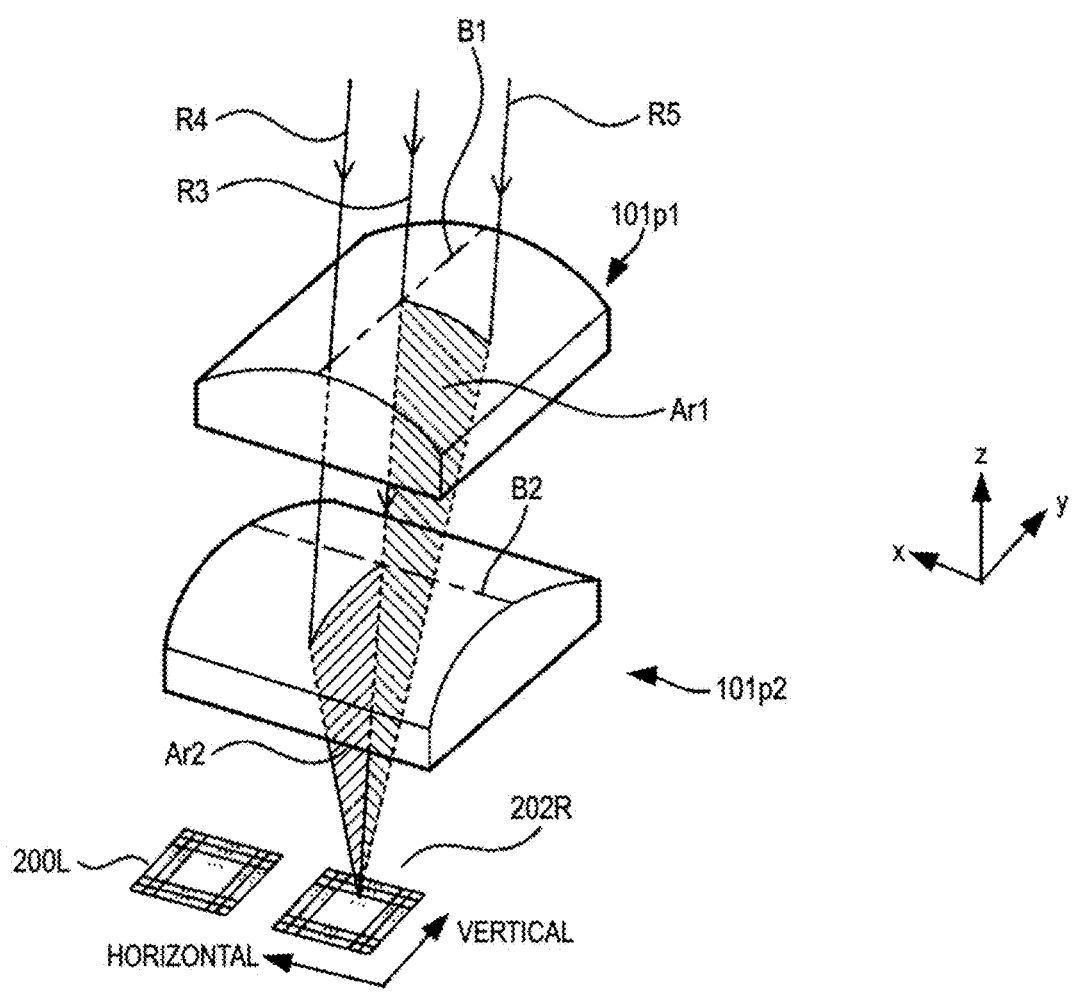
FIG. 13 is a diagram illustrating a case where light beams are refracted when two positive cylindrical lenses are disposed in an overlapping manner such that generating lines thereof are perpendicular to each other.

FIG. 13 is a diagram illustrating light paths of light beams passing through lenses when a positive lens 101*p*1 and a positive lens 101*p*2 constituted by cylindrical lenses are disposed such that generating lines are perpendicular to each other in disposition directions. In FIG. 13, it is assumed that light beams are incident from the above in the figure and travel downward. The positive lens 101*p*1 disposed on a subject side (upper side) (not shown) is arranged such that a side with the curved surface is parallel to disposition directions of an imaging unit (not shown) including the imaging device 202L and an imaging unit including the imaging device 202R. Here, the two imaging units are disposed so as to be aligned in the horizontal direction, and thus the disposition directions of the imaging units match with the horizontal direction of the disposition of the pixels in the imaging device 202L and the imaging device 202R. In addition, the positive lens 101*p*2 disposed under the positive lens 101*p*1 is arranged such that a side with the curved surface is disposed at a position perpendicular to the disposition directions of the imaging unit 200L and the imaging unit 200R.

The light beam R3 and a light beam R4 incident on the positive lens 101*p*1 disposed on the subject side along the generating line B1 go straight as they are without receiving an operation of the lens. In contrast, a light beam R5 which is a light beam parallel to the light beam R3 and the light beam R4 and is incident on a portion other than the generating line B1 of the positive lens 101*p*1 is refracted inward by receiving the operation of the lens.

However, the refraction occurs only in the x axis direction (transverse direction) and does not occur in the y axis direction (longitudinal direction). Thereby, both the light beam R3 and the light beam R5 travel on a plane region Ar1 indicated by the diagonally right down lines on the x-z plane. That is to say, the subject light with the width in the x axis direction passes through the positive lens 101*p*1, and thereby the width thereof in the transverse direction is reduced.

The light beam R3 which is incident onto the generating line B1 of the positive lens 101*p*1 and goes straight through the positive lens 101*p*1 is incident onto the generating line B2 of the underlying positive lens 101*p*2. For this reason, the light beam R3 goes straight as it is without receiving an operation of the positive lens 101*p*2. On the other hand, the light beam R4 which is incident onto the generating line B1 of the positive lens 101*p*1 and goes straight through the positive lens 101*p*1 is incident on a position deviated from the generating line B2 in the positive lens 101*p*2. For this reason, the light beam is refracted inward by a lens function of the curved surface of the positive lens 101*p*2. The refraction of the light beam R4 occurs only in the x axis direction and does not occur in the y axis direction.

Thereby, both the light beam R3 and the light beam R4 travel on a plane region Art indicated by the diagonally left down lines on the y-z plane. In other words, it can be seen that the subject light with the width in the y axis direction passes through the positive lens 101*p*2, and thereby the width thereof in the longitudinal direction is reduced. As such, if two cylindrical lenses are disposed at positions where generating lines thereof are perpendicular to each other, widths of an image in both longitudinal direction and transverse direction can be variably magnified. In other words, variable magnification ratios in the longitudinal and transverse directions can be made to be the same in principle, and it is possible to obtain the same result as a capturing result obtained by using the objective optical system 10 constituted by typical spherical negative lens and positive lens.

In addition, in the positive lens 101*p*1 and the positive lens 101*p*2 constituted by cylindrical lenses, distortion aberration in the generating line B does not occur. Thereby, aberration where a straight line image is curved, such as pin cushion type or barrel type aberration known as distortion aberration of a spherical lens, does not occur.

Figure 14A:
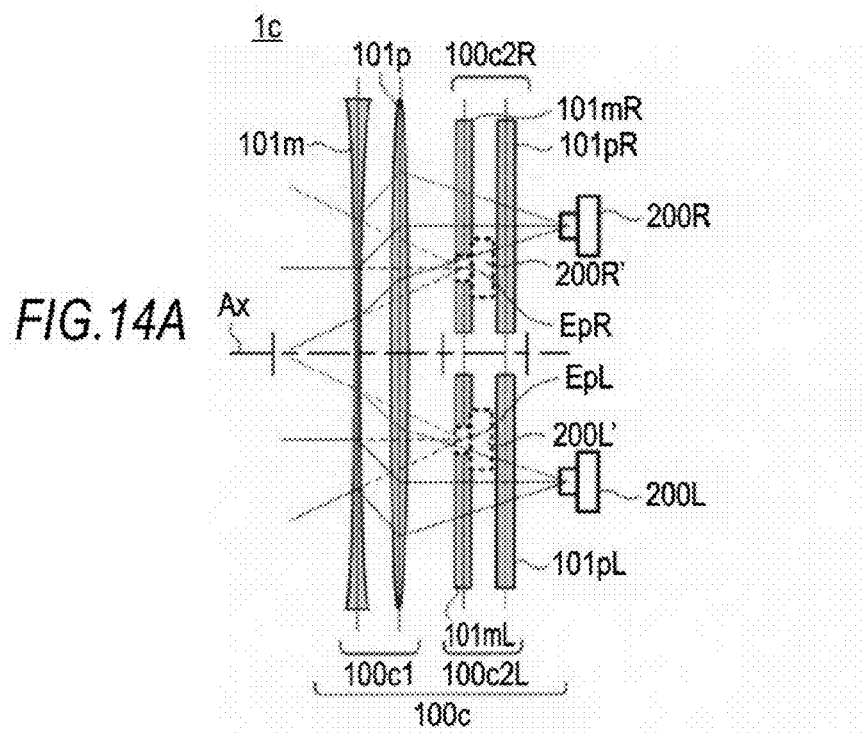
FIGS. 14A and 14B are schematic diagrams illustrating a configuration example of a stereoscopic imaging apparatus according to a third embodiment of the present disclosure, where
Figure 14B:
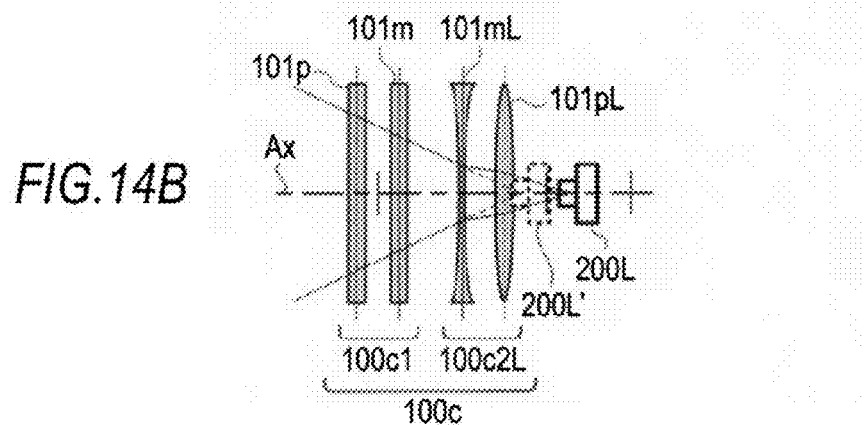

FIG. 14A is a top view where the stereoscopic imaging apparatus 1*c* is viewed from the top, and FIG. 14B is a side view where the stereoscopic imaging apparatus 1*c* is viewed from the left side (side where the imaging device 202L is disposed). In FIGS. 14A and 14B, the parts corresponding to FIGS. 7A and 7B and 11A and 11B are given the same reference numerals. As shown in FIG. 14A, the stereoscopic imaging apparatus 1*c* includes an objective optical system 100*c* configured as an anamorphic optical system, an imaging unit 200L, and an imaging unit 200R.

The objective optical system 100*c* is constituted by a first objective optical system 100*c*1, a second objective optical system 100*c*2L, and a second objective optical system 100*c*2R. The first objective optical system 100*c*1 includes a negative lens 101*m* and a positive lens 101*p*, the negative lens 101*m* is disposed on a subject side (not shown), and the positive lens 101*p* is disposed on the rear side thereof (an emission side of subject light). A configuration of the first objective optical system 100*c*1 is the same as that of the objective optical system 100 shown in FIG. 7A.

The first objective optical system 100*c*1 is disposed at the previous stage of the imaging unit 200L and the imaging unit 200R, and thereby an effective pupil EpL and an effective pupil EpR are formed in the same manner as the configuration shown in FIG. 7A. In addition, the effective IAD which is a gap between the effective pupil EpL and the effective pupil EpR is shorter than the physical IAD defined by the disposition of the imaging unit 200L and the imaging unit 200R. In other words, the first objective optical system 100*c*1 is disposed at the previous stage of the imaging unit 200L and the imaging unit 200R, and thereby it is possible to achieve the same effect as in the configuration shown in FIGS. 7A and 7B.

In the present embodiment, the second objective optical system is provided on the rear side of the first objective optical system 100c1. The second objective optical system is constituted by the second objective optical system 100c2L installed so as to correspond to an image forming optical system (not shown) in the imaging unit 200L and the second objective optical system 100c2R installed so as to correspond to an image forming optical system (not shown) in the imaging unit 200R. The second objective optical system 100c2L and the second objective optical system 100c2R are disposed such that lens centers thereof are respectively located on an optical axis AxL and an optical axis AxR of the image forming optical systems (not shown) of the imaging unit 200L and the imaging unit 200R.

The second objective optical system 100c2L and the second objective optical system 100c2R are respectively constituted by a negative lens 101m and a positive lens 101p, and the negative lens 101m is disposed on the subject side (not shown), and the positive lens 101p is disposed on the rear side thereof.

In addition, in the second objective optical system 100c2L and the second objective optical system 100c2R, disposition directions of the lenses constituting each of them are reverse to disposition directions of the lenses constituting the first objective optical system 100c1. In other words, the generating lines of the positive and negative lenses in each objective optical system 100c2 are parallel to each other, but the generating lines of the first objective optical system 100c1 and the second objective optical system 100c2 are disposed so as to be perpendicular to each other. In addition, the generating line of the first objective optical system 100c1 is disposed at a position perpendicular to disposition directions (x axis direction in the figures) of the imaging unit 200L and the imaging unit 200R, that is, at a position parallel to the y axis direction in the figures.

With this disposition, as shown in FIG. 14A, light beams incident on the objective optical system 100c in the transverse direction (the x axis direction in the figure) are refracted by the first objective optical system 100c1 and go straight through the second objective optical system 100c2L and the second objective optical system 100c2R. On the other hand, as shown in FIG. 14B, light beams incident on the objective optical system 100c in the longitudinal direction (the y axis direction in the figure) go straight through the first objective optical system 100c1 and are refracted by the second objective optical system 100c2L and the second objective optical system 100c2R.

In other words, the subject light incident from the left side of a screen is varied in magnification in the transverse direction by the first objective optical system 100c1, and a field angle of the imaging unit 200L and the imaging unit 200R in the transverse direction is widened. Thereby, the length of the effective IAD is also variably magnified (reduced). Subsequently, a length in the longitudinal direction is variably magnified (reduced) by the second objective optical system 100c2, and a field angle of the imaging unit 200L and the imaging unit 200R in the longitudinal direction is widened. At this time, by combining the variable magnification ratio of the first objective optical system 100c1 (afocal magnification) and the variable magnification ratio of the second objective optical system 100c2, aspect ratios in parallax images can be substantially the same as that obtained by the configuration shown in FIG. 2B as an example of the case of using a spherical lens.

Configurations of the other blocks of the stereoscopic imaging apparatus 1c may be the configurations shown in FIG. 3, or may be the configurations shown in FIG. 9 such that correction of aberration is performed in terms of a signal. However, in the present embodiment, since an aspect ratio of an image is not varied by light beams passing through the objective optical system 100c, it is not necessary to correct an aspect ratio even if the configuration shown in FIG. 9 is applied.

According to the above-described third embodiment, it is possible to achieve effects equivalent to the effects achieved by the first embodiment. In addition to the effects, it is possible to make the aspect ratios in left and right parallax images substantially the same.

Figures 15A, 15B:
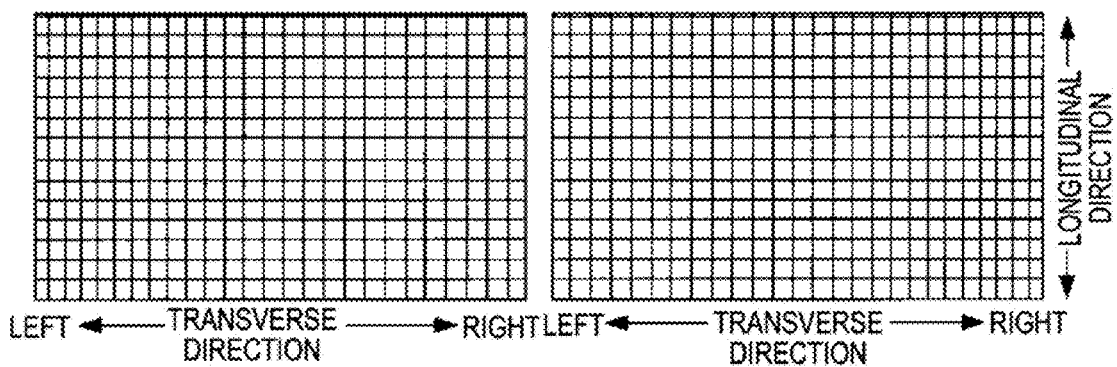
FIGS. 15A and 15B are diagrams illustrating examples of left and light parallax images captured by the stereoscopic imaging apparatus according to the third embodiment and a fourth embodiment of the present disclosure, where

FIGS. 15A and 15B schematically show images of capturing results when a lattice pattern with the same interval is captured by the stereoscopic imaging apparatus 1c shown in FIGS. 14A and 14B. FIG. 15A shows a left eye parallax image, and FIG. 15B shows a right eye parallax image. As described above, the widths of the parallax images in the transverse direction are first variably magnified by the first objective optical system 100c1, and the widths in the longitudinal direction are variably magnified, in the same amount, or substantially the same amount, as the magnification by the first objective optical system, by the second objective optical system 100c2L and the second objective optical system 100c2R. Thereby, the intervals of the lattice pattern in the captured parallax images are substantially the same in the longitudinal and transverse directions.

However, in the images shown in FIGS. 15A and 15B, the lattice pattern has unequal intervals due to influence of aberration on account of assuming that the whole distortion aberration of the objective optical system 100c may not be optically corrected. Specifically, on account of assuming that distortion aberration corresponding to barrel aberration in a spherical lens is generated, lattice intervals are slightly shorter in the left end of the left image and the right end of the right image on which the aberration exerts greater effects. However, the distortion aberration is generated according to refraction in the anamorphic optical system, and thus distortion aberration in the tilt direction of an image is not generated in principle.

In addition, as shown in FIG. 14A, in the second objective optical systems 100c2L and 100c2R, the lens centers exist on optical axes of image forming optical systems (not shown), and thus an extent of distortion aberration is smaller than that in the first objective optical system 100c1. Thereby, aberration appearing in an image signal captured by the stereoscopic imaging apparatus 1c shown in FIGS. 14A and 14B becomes such aberration where the transverse lines are not distorted but are maintained as transverse lines, and intervals of the transverse lines become narrower toward the upper and lower ends of the image as shown in FIGS. 15A and 15B. For this reason, it is possible to cause aberration to be easily handled in terms of an image process as compared with distortion aberration of the spherical lens where pixels in original transverse lines may not be calculated if a plurality of lines are not held.

6. Fourth Embodiment

Next, a fourth embodiment of the present disclosure will be described with reference to FIGS. 16A and 16B. In the present embodiment, in order to reduce the length of an objective optical system 100d in the optical axis direction, a disposition direction and disposition order of lenses constituting the objective optical system 100d which is configured as an anamorphic optical system are adjusted.

Figure 16A:
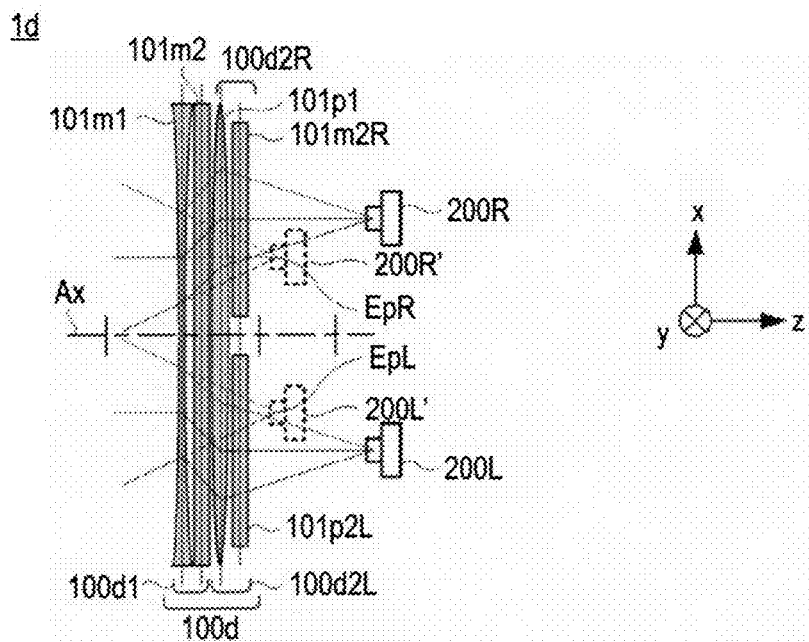
FIGS. 16A and 16B are schematic diagrams illustrating a configuration example of the stereoscopic imaging apparatus according to the fourth embodiment of the present disclosure, where
Figure 16B:
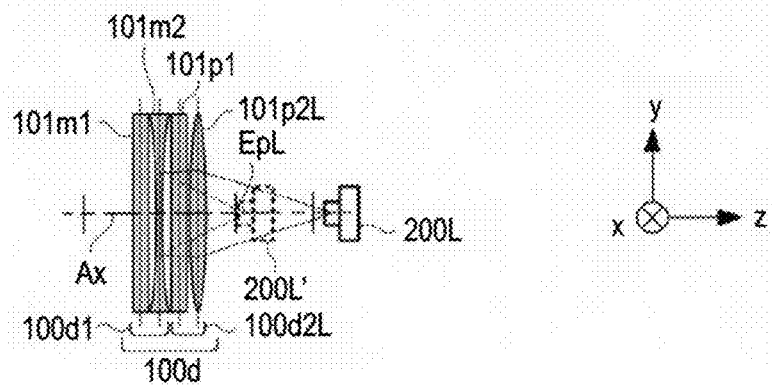

FIG. 16A is a top view where the stereoscopic imaging apparatus 1d is viewed from the top, and FIG. 16B is a side view where the stereoscopic imaging apparatus 1d is viewed from the left side (side where the imaging device 202L is disposed). In FIGS. 16A and 16B, the parts corresponding to FIGS. 7A and 7B, 11A and 11B and 14A and 14B are given the same reference numerals and repeated description will be omitted.

The stereoscopic imaging apparatus 1d shown in FIGS. 16A and 16B includes a first objective optical system 100d1 which performs variable magnification in the transverse direction for parallax images and a second objective optical system 100d2 which performs variable magnification in the longitudinal direction for parallax images. The first objective optical system 100d1 is constituted by a negative lens 101m1 and a positive lens 101p1, and both the lenses have the size covering both a field angle of the imaging unit 200L and a field angle of the imaging unit 200R. In addition, the first objective optical system 100d1 is used to perform variable magnification in the transverse direction for parallax images, and is thus disposed such that a side with the curved surface is parallel to the disposition directions (the x axis direction in the figures) of the imaging unit 200L and the imaging unit 200R.

The second objective optical system 100d2 is constituted by a negative lens 101m2, a positive lens 101p2L, and a positive lens 101p2R. The negative lens 101m2 has the size covering both a field angle of the imaging unit 200L and a field angle of the imaging unit 200R, the positive lens 101p2L is provided so as to correspond to the imaging unit 200L, and the positive lens 101p2R is provided so as to correspond to the imaging unit 200R. The second objective optical system 100d2 is used to perform variable magnification in the longitudinal direction for parallax images, and is thus disposed such that a side with the curved surface is parallel to the disposition directions (the y axis direction in the figures) of the imaging unit 200L and the imaging unit 200R.

In addition, the lenses constituting the first objective optical system 100d1 and the second objective optical system 100d2 are alternately disposed in the optical axis direction. Specifically, the negative lens 101m1, the negative lens 101m2, the positive lens 101p1, and the positive lens 101p2L (or the positive lens 101p2R) are disposed in this order from the subject side.

Configurations of the other blocks of the stereoscopic imaging apparatus 1d may be the configurations shown in FIG. 3, or may be the configurations shown in FIG. 9 such that correction of aberration is performed in terms of a signal. However, in the present embodiment as well, since an aspect ratio of an image is not varied by light beams passing through the objective optical system 100d, it is not necessary to correct an aspect ratio even if the configuration shown in FIG. 9 is applied.

Capturing results of parallax images performed by the stereoscopic imaging apparatus 1d according to the present embodiment are also the same as those shown in FIGS. 15A and 15B. In other words, the above-described fourth embodiment also can achieve effects equivalent to the effects achieved by the third embodiment. In addition, with such a configuration of the objective optical system 100d, it is possible to reduce the length of the objective optical system 100d in the optical axis direction as compared with the objective optical system 100c according to the third embodiment shown in FIGS. 14A and 14B. Thereby, since the overall objective optical system 100d can be close to each other by the disposition positions of the imaging unit 200L and the imaging unit 200R which are physical cameras, it is possible to make a lens aperture for covering a field angle smaller.

In addition, in the example shown in FIGS. 16A and 16B, two lenses which are located close to the imaging unit 200L and the imaging unit 200R of the lenses constituting the second objective optical system 100d2 are provided so as to correspond to the respective imaging units 200, but the present disclosure is not limited thereto. If lenses disposed at positions closest to the imaging unit 200L and the imaging unit 200R are divided into left and right sides, it is possible to achieve light weight of the overall objective optical system 100d; however, the lenses may not be divided.

With this configuration, limitation in a disposition order in the optical axis directions of the lenses constituting the first objective optical system 100d1 and the second objective optical system 100d2 disappears. In other words, the following combinations can be realized. In the following, "longitudinal" indicates a lens which variably magnifies lengths of parallax images in the longitudinal direction, and "transverse" indicates a lens which variably magnifies lengths of parallax images in the transverse direction.

longitudinal-transverse-longitudinal-transverse
transverse-longitudinal-transverse-longitudinal
longitudinal-longitudinal-transverse-transverse
transverse-transverse-longitudinal-longitudinal
longitudinal-transverse-transverse-longitudinal
transverse-longitudinal-longitudinal-transverse 7. Various Modified Examples In addition, in the above-described respective embodiments, for better understanding of the description, the respective lenses constituting the objective optical system 100 are thin lenses. However, the objective optical system 100 may be constituted by a plurality of lenses or a plurality of lens groups, filters, diaphragm, lens driving mechanism, and the like. The image forming optical system 201L and the image forming optical system 201R may also be constituted by a plurality of lenses or a plurality of lens groups, filters, diaphragm, lens driving mechanism, and the like.

Although, in the above-described respective embodiments, the description thereof has been made on the basis of the configuration, shown in FIG. 2D, in which the negative lens is disposed on the subject side and the positive lens is disposed on the rear side thereof, the present disclosure is not limited thereto. The present disclosure may be applied to the configuration in which only the positive lenses are used as shown in FIG. 2A, or the configuration in which the positive lens is disposed on the subject side and the negative lens is disposed on the rear side thereof as shown in FIG. 2C. Alternatively, the present disclosure may be applied to a case where the objective optical system 10 is a focal optical system as shown in FIGS. 1A and 1B.

In addition, the objective optical system 100 in the above-described respective embodiments may be produced as a unit and may be attachable to and detachable from general 3D cameras (stereoscopic imaging apparatuses) which are available in the market. If the objective optical system 100 according to the embodiments of the present disclosure is installed at the general 3D cameras, it is possible to change appearance of distortion aberration occurring in images captured by the cameras and to thereby reduce adverse effects which the distortion aberration exerts on forming of stereoscopic vision.

Figure 17:
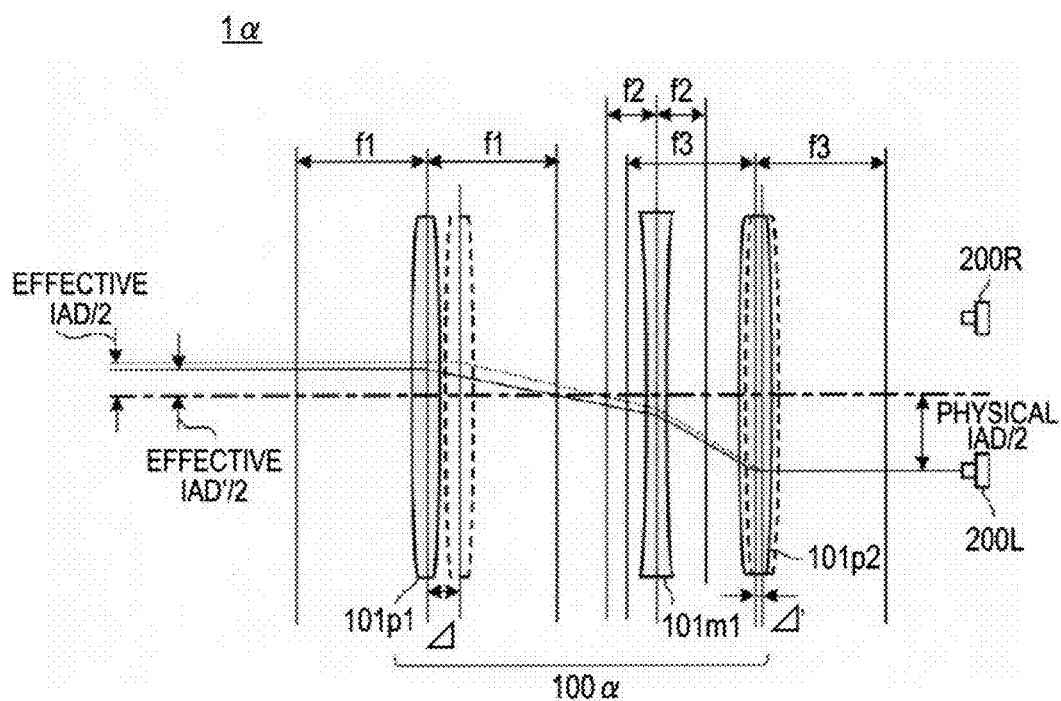
FIG. 17 is a top view illustrating a configuration example of a stereoscopic imaging apparatus according to a modified example of the present disclosure.

In addition, in the above-described respective embodiments, the effective IAD may be varied. In order to vary the effective IAD, an objective optical system driving unit (not shown) for moving an objective optical system 100α in the optical axis direction is necessary. FIG. 17 is a diagram illustrating an example of the case where the objective optical system 100α is configured as an afocal optical system. If zooming is to be performed without violating conditions of the afocal optical system, the number of lenses constituting the objective optical system 100α is at least three.

In the example shown in FIG. 17, the objective optical system 100α is constituted by a positive lens 101p1, a negative lens 101m1, and a positive lens 101p2, and, in order from a subject side (the left side of the figure), the positive lens 101p1, the negative lens 101m1, and the positive lens 101p2 are disposed in the optical axis direction. Here, it is assumed that the positive lens 101p1 is moved by Δ from the position indicated by the broken line toward the subject side (not shown) on the optical axis Ax, and the positive lens 101p2 is moved by Δ' from the position indicated by the broken line. Then, the effective IAD', indicated by the solid line, formed by the disposition after the movement is shortened than the effective IAD, indicated by the broken line, formed by the disposition before the movement. Along therewith, afocal magnification of the objective optical system 100α is varied before and after the movement. In other words, the variable magnification ratio (a first refractive power and/or a second refractive power) in the longitudinal direction and/or the transverse direction by the objective optical system 100α is varied.

In other words, by moving the positive lens 101p1 closest to the subject together with the positive lens 101p2 closest to the imaging unit 200L (200R), it is possible to maintain the afocal optical system and adjust a length of the effective IAD to a desired length. In addition, according to this adjustment, the afocal magnification of the objective optical system 100α is varied.

Further, the movement amount Δ of the positive lens 101p1 and the movement amount Δ' of the positive lens 101p2 are defined by the length of the effective IAD which is desired to be realized. A combination of the movement amount Δ and the movement amount Δ' is set in advance, and two lenses are moved in the same direction on the basis thereof, thereby easily adjusting a length of the effective IAD.

Figure 18A:
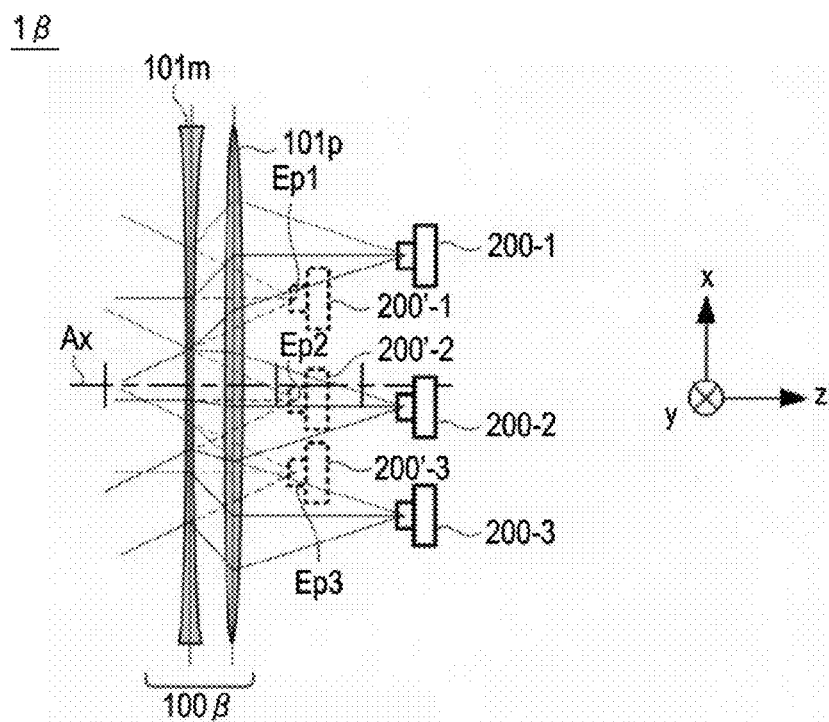
FIGS. 18A and 18B are schematic diagrams illustrating a configuration example of a stereoscopic imaging apparatus according to a modified example of the present disclosure, where
Figure 18B:
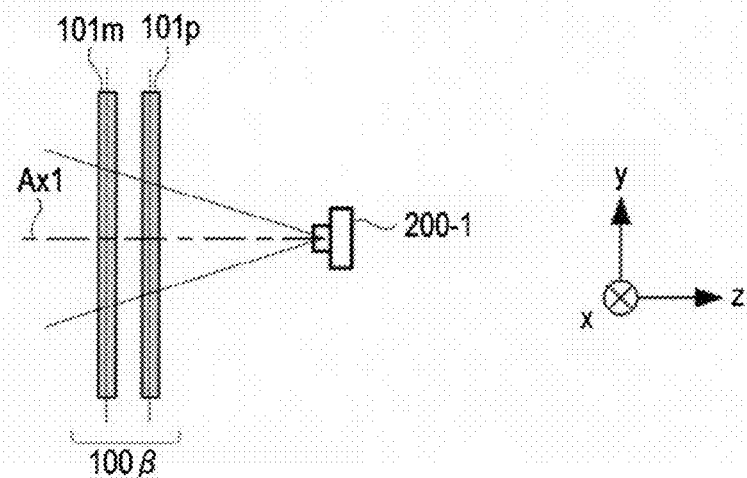

In addition, although, in the above-described respective embodiments, a case where two imaging units 200 are provided has been exemplified, the present disclosure is not limited thereto. For example, three or more imaging units 200 may be provided. FIGS. 18A and 18B show an example where three imaging units 200 (an imaging unit 200-1 to an imaging unit 200-3) are disposed so as to be arranged in the horizontal direction, and, the objective optical system 100 according to the first embodiment is used as an objective optical system. In FIGS. 18A and 18B, the parts corresponding to FIGS. 7A and 7B, 11A and 11B, 14A and 14B, and 16A and 16B are given the same reference numerals and repeated description will be omitted.

FIG. 18A is a top view where a stereoscopic imaging apparatus 1β is viewed from the top, and FIG. 18B is a side view where the stereoscopic imaging apparatus 1β is viewed from the side (side where the imaging unit 200-3 is disposed). Even in a case where three imaging units 200 are provided, as shown in FIG. 18A, a gap between adjacent different cameras in an effective camera 200'-1 to an effective camera 200'-3 is shorter than a gap between two of the imaging unit 200-1 to the imaging unit 200-3 which are physically disposed. More specifically, a gap between a position of the effective pupil Ep in any one camera of the effective camera 200'-1 to the effective camera 200'-3 and the optical axis Ax of the objective optical system 100β is narrower than a gap between a lens center of any one of the imaging units 200 and the optical axis Ax.

In addition, as shown in FIG. 18B, light beams incident on an objective optical system 100β in the y axis direction (longitudinal direction) are not refracted but go straight. In other words, the light beams incident in the longitudinal direction are not refracted since the objective optical system 100β configured as an anamorphic optical system is equivalent to a thin plate glass. That is to say, even in the case where the three imaging units 200 are provided, it is possible to achieve the same effects as the effects achieved by the first embodiment.

In addition, the present disclosure may be applied to a configuration where a plurality of imaging units 200 are disposed so as to be arranged not in the horizontal direction but in the vertical direction. FIG. 19A is a top view where a stereoscopic imaging apparatus 1γ configured in this way is viewed from the top, and FIG. 19B is a side view where the stereoscopic imaging apparatus 1γ is viewed in the transverse direction. In the stereoscopic imaging apparatus 1γ shown in FIGS. 19A and 19B, an imaging unit 200-1 and an imaging unit 200-2 are disposed so as to be arranged in the vertical direction. When the imaging units 200 are disposed in this way, as shown in FIGS. 19A and 19B, it is necessary to dispose a negative lens 101m and a positive lens 101p constituting the objective optical system 100γ such that generating lines thereof are perpendicular to the disposition directions of the imaging unit 200-1 and the imaging unit 200-2. With this configuration, it is possible to achieve the same effects as the effects achieved by the first embodiment.

In addition, although a case where the objective optical system 100 according to the first embodiment is used as an objective optical system in FIGS. 17A to 19B has been exemplified, the present disclosure is not limited thereto. In the stereoscopic imaging apparatuses 1 according to the other embodiments, even if a plurality of imaging units 200 are provided, it is possible to achieve the same effects as the effects achieved by the respective embodiments.

In addition, the present disclosure may have the following configurations.

(1) An imaging system including a first imaging unit; a second imaging unit; and an objective optical system optically coupled to the first imaging unit and the second imaging unit, wherein the objective optical system has a first direction along which light is refracted and a second direction along which light is refracted differently.

(2) The imaging system according to (1), wherein the objective optical system is an anamorphic optical system.

(3) The imaging system according to (1), wherein light is not refracted along the second direction.

(4) The imaging system according to (1), wherein the effective inter axial distance of the imaging system is different from the physical inter axial distance defined by the dispositions of the first imaging unit and the second imaging unit.

(5) The imaging system according to (1), wherein the effective interaxial distance is less than the physical inter axial distance.

(6) The imaging system according to (1), wherein the effective interaxial distance is greater than the physical inter axial distance.

(7) The imaging system according to (4), wherein the objective optical system includes a positive lens.

(8) The imaging system according to (4), wherein the objective optical system includes a negative lens.

(9) The imaging system according to (1), wherein the objective optical system includes a positive lens and a negative lens.

(10) The imaging system according to (1), wherein the objective optical system is an afocal optical system.

(11) The imaging system according to (1), wherein the optical axis of each of the first imaging unit and the second imaging unit is parallel to the optical axis of the objective optical system.

(12) The imaging system according to (1), wherein the objective optical system includes at least one cylindrical lens.

(13) The imaging system according to (1), wherein each of the first imaging unit and the second imaging unit includes an image forming optical system and an imaging device.

(14) The imaging system according to (1), wherein the first imaging unit and the second imaging unit are disposed so as to be symmetric to each other with respect to the optical axis of the objective optical system.

(15) The imaging system according to (1), further including a second objective optical system optically coupled to the first imaging unit and the second imaging unit, wherein the second objective optical system has a first direction along which light is refracted and a second direction along which light is refracted differently.

(16) The imaging system according to (15), wherein the objective optical system variably magnifies in a first direction and the second objective optical system variably magnifies in a second direction different from the first direction.

(17) The imaging system according to (16), wherein the magnification provided by the objective optical system is the same, or substantially the same, as the magnification provided by the second objective optical system.

(18) The imaging system according to (16), wherein the objective optical system and the second objective optical system each include a plurality of lenses, and the disposition of the lenses of the objective optical system and the second objective optical system along an optical axis is such that the lenses of either the objective optical system or the second objective optical system are non-adjacent.

(19) The imaging system according to (1), further including a second objective optical system for each of the first imaging unit and the second imaging unit, wherein each second objective optical system is optically coupled to a respective imaging unit and has a first direction along which light is refracted and a second direction along which light is refracted differently.

(20) The imaging system according to (19), wherein the objective optical system variably magnifies in a first direction and each second objective optical system variably magnifies in a second direction different from the first direction.

(21) The imaging system according to (20), wherein the magnification provided by the objective optical system is the same, or substantially the same, as the magnification provided by each second objective optical system.

(22) The imaging system according to (19), wherein the objective optical system and each second objective optical system variably magnify in the same direction.

(23) The imaging system according to (22), wherein, for each second objective optical system, the magnification provided by the second objective optical system is the reciprocal of the magnification provided by the objective optical system.

(24) The imaging system according to (15), wherein the objective optical system and each second objective optical system each include a plurality of lenses and, for each second objective optical system, the disposition of the lenses of the objective optical system and the second objective optical system along an optical axis is such that the lenses of either the objective optical system or the second objective optical system are non-adjacent.

(25) The imaging system according to (15), wherein the objective optical system and the second objective optical system variably magnify in the same direction.

(26) The imaging system according to (25), wherein the variable magnification provided by the second objective optical system is the reciprocal of the variable magnification provided by the objective optical system.

(27) The imaging system according to (1), further including a driving unit for moving the objective optical system in an optical axis direction.

(28) The imaging system according to (27), wherein the objective optical system includes at least three lenses.

(29) An imaging system including a first imaging unit; a second imaging unit; an objective optical system optically coupled to the first imaging unit and the second imaging unit, wherein the objective optical system has a first direction along which light is refracted and a second direction along which light is refracted differently; and a processor for performing an aberration correcting process.

(30) An imaging method including providing an objective optical system optically coupled to a first imaging unit and a second imaging unit, wherein the objective optical system has a first direction along which light is refracted and a second direction along which light is refracted differently; capturing a first image from the objective optical system using the first imaging unit; and capturing a second image from the objective optical system using the second imaging unit.

The present disclosure may also have the following configurations.

(1) A stereoscopic imaging apparatus including: an objective optical system that is an optical system which incorporates light beams emitted from a subject and guides the light beams to a subsequent stage and where a first refractive power in a first direction on a surface perpendicular to an optical axis is lower than a second refractive power in a second direction perpendicular to the first direction; a plurality of image forming optical systems that form a plurality of subject light fluxes emitted from different paths of the objective optical system as parallax images; and a plurality of imaging devices that are provided so as to correspond to the plurality of image forming optical systems and convert the parallax images formed by the plurality of image forming optical systems into image signals.

(2) The stereoscopic imaging apparatus set forth in (1), wherein the objective optical system is an anamorphic optical system.

(3) The stereoscopic imaging apparatus set forth in (1) or (2), wherein, in the objective optical system, the first direction corresponds to a direction perpendicular to disposition directions of the plurality of imaging devices, and the second direction is set to correspond to disposition directions of the plurality of imaging devices.

(4) The stereoscopic imaging apparatus set forth in (1) or (2), wherein the objective optical system includes a first objective optical system and a second objective optical system, and the first objective optical system and the second objective optical system have reverse magnification to each other.

(5) The stereoscopic imaging apparatus set forth in any one of (1) to (4), wherein the second objective optical system is separately provided so as to correspond to the plurality of image forming optical systems and is disposed between the first objective optical system and the image forming optical systems.

(6) The stereoscopic imaging apparatus set forth in (1) or (2), wherein the objective optical system includes a first objective optical system and a second objective optical system, and wherein, in the first objective optical system, the first direction is set to correspond to a vertical direction in a disposition of pixels constituting the image devices, and in the second objective optical system, the first direction is set to correspond to a horizontal direction in a disposition of the pixels constituting the image devices.

(7) The stereoscopic imaging apparatus set forth in any one of (1) to (6), wherein the second objective optical system is separately provided so as to correspond to the plurality of image forming optical systems and is disposed between the first objective optical system and the image forming optical systems.

(8) The stereoscopic imaging apparatus set forth in any one of (1) to (7), wherein the first objective optical system and the second objective optical system are disposed in an optical axis direction of the first objective optical system in order of the first objective optical system and the second objective optical system from the subject side.

(9) The stereoscopic imaging apparatus set forth in (1) or (2), further including an objective optical system driving unit that moves the objective optical system in an optical axis direction, wherein the first refractive power and/or the second refractive power in the objective optical system are (is) varied depending on a movement amount of the objective optical system by the objective optical system driving unit.

(10) The stereoscopic imaging apparatus set forth in (1) or (2), wherein the objective optical system is configured to be attachable to and detachable from an imaging unit including the image forming optical systems and the imaging devices.

(11) The stereoscopic imaging apparatus set forth in (1) or (2), further including: a signal processing unit that performs a signal process for image signals generated by the imaging devices; and an image processing unit that performs an image process for the image signals having undergone the signal process in the signal processing unit, wherein the signal processing unit or the image processing unit performs correction for reducing distortion occurring due to the second refractive power.

(12) The stereoscopic imaging apparatus set forth in any one of (1) to (11), wherein the signal processing unit or the image processing unit compares an expected image which is prepared in advance and does not include aberration with an observed image by the image signals so as to generate a correction parameter for reducing the aberration, and corrects the aberration using the correction parameter.

(13) The stereoscopic imaging apparatus set forth in any one of (1) to (12), further including a longitudinal and transverse axes deviation detecting unit that determines whether or not the first direction and the second direction in the objective optical system match with a vertical direction and a horizontal direction in the observed image, wherein the signal processing unit or the image processing unit performs correction for removing the axis deviation on the basis of a result detected by the longitudinal and transverse axes deviation detecting unit.

(14) The stereoscopic imaging apparatus set forth in any one of (1) to (13), further including an objective optical system driving mechanism that moves the objective optical system in a rotation direction with respect to an optical axis thereof on the basis of a result detected by the longitudinal and transverse axes deviation detecting unit, wherein the objective optical system driving mechanism moves a position of the objective optical system in the rotation direction according to a result detected by the longitudinal and transverse axes deviation detecting unit.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system comprising:
    a first imaging device;
    a second imaging device;
    a first objective optical system having a first optical axis associated therewith, said first objective optical system having a first negative lens and a first positive lens which are arranged along the first optical axis such that the first negative lens is disposed on a subject side and the first positive lens is disposed on a rear side thereof which is opposite the subject side; and
    two second objective optical systems, each second objective optical system (i) having a second optical axis associated therewith, (ii) provided on the rear side of the first objective optical system, and (iii) having a second positive lens and a second negative lens arranged along the respective second optical axis such that the second positive lens is disposed on the subject side and the second negative lens is disposed on a rear side thereof such that the second positive lens and the second negative lens of each said second objective optical system is disposed reverse to that of the first negative lens and the first positive lens of the first objective optical system,
    said first positive lens of said first objective optical system being a first convex lens having a front convex side which faces the subject side and a rear convex side which faces away from the subject side, and said second positive lens of each said second objective optical system being a second convex lens having a front convex side which faces the subject side and a rear convex side which faces away from the subject side,
    said first objective optical system being arranged such that the rear convex side of the first convex lens thereof faces the front convex side of the second convex lens of each of the two second objective optical systems, and
    one of said two second objective optical systems being configured to be optically coupled to one of the first imaging device or the second imaging device and the other one of said two second objective optical systems being configured to be optically coupled to the other one of the first imaging device or the second imaging device.

2. The imaging system as recited in claim 1, in which the first objective optical system and the two second objective optical systems are configured as an anamorphic optical system.

3. The imaging system as recited in claim 1, in which an afocal magnification of each of the two second objective optical systems is a reciprocal of an afocal magnification of the first objective optical system.

4. The imaging system as recited in claim 1, in which each of the first imaging device and the second imaging device has an optical axis associated therewith which are located such that the optical axis of the first imaging device is located on the second optical axis of one of said two second objective optical systems and the optical axis of the second imaging device is located on the second optical axis of the other one of said two second objective optical systems.

5. The imaging system as recited in claim 1, wherein the first imaging device and the second imaging device are disposed so as to be symmetric to each other with respect to the first optical axis of the first objective optical system.

6. The imaging system as recited in claim 1, further comprising a driving unit for moving the first objective optical system in a direction parallel to the first optical axis.

7. The imaging system as recited in claim 1, further comprising a processor for performing an aberration correcting process.

8. An imaging method comprising;
providing a first objective optical system having a first optical axis associated therewith, said first objective optical system having a first negative lens and a first positive lens which are arranged along the first optical axis such that the first negative lens is disposed on a subject side and the first positive lens is disposed on a rear side thereof which is opposite the subject side;
providing two second objective optical systems, each second objective optical system (i) having a second optical axis associated therewith, (ii) provided on the rear side of the first objective optical system, and (iii) having a second positive lens and a second negative lens arranged along the respective second optical axis such that the second positive lens is disposed on the subject side and the second negative lens is disposed on a rear side thereof such that the second positive lens and the second negative lens of each said second objective optical system is disposed reverse to that of the first negative lens and the first positive lens of the first objective optical system;
said first positive lens of said first objective optical system being a first convex lens having a front convex side which faces the subject side and a rear convex side which faces away from the subject side, and said second positive lens of each said second objective optical system being a second convex lens having a front convex side which faces the subject side and a rear convex side which faces away from the subject side,
said first objective optical system being arranged such that the rear convex side of the first convex lens thereof faces the front convex side of the second convex lens of each of the two second objective optical systems, and
one of said two second objective optical systems being configured to be optically coupled to one of the first imaging device or the second imaging device and the other one of said two second objective optical systems being configured to be optically coupled to the other one of the first imaging device or the second imaging device,
capturing a first image using the first imaging device; and
capturing a second image using the second imaging device.

* * * * *